(12) United States Patent
Hou et al.

(10) Patent No.: US 11,131,554 B2
(45) Date of Patent: Sep. 28, 2021

(54) SYSTEMS AND METHODS FOR VEHICLE TELEMETRY

(71) Applicant: Beijing Voyager Technology Co., Ltd., Beijing (CN)

(72) Inventors: Tingbo Hou, Santa Clara, CA (US); Guomin Xiang, San Jose, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 83 days.

(21) Appl. No.: 16/232,472

(22) Filed: Dec. 26, 2018

(65) Prior Publication Data

US 2020/0209002 A1 Jul. 2, 2020

(51) Int. Cl.
*G01C 21/34* (2006.01)
*G07C 5/00* (2006.01)
*G05D 1/00* (2006.01)
*G05D 1/02* (2020.01)
*G06N 20/00* (2019.01)

(52) U.S. Cl.
CPC ....... *G01C 21/3461* (2013.01); *G05D 1/0088* (2013.01); *G05D 1/0221* (2013.01); *G06N 20/00* (2019.01); *G07C 5/008* (2013.01); *G05D 2201/0213* (2013.01)

(58) Field of Classification Search
CPC .............. G01C 21/34; G01C 21/3415; G01C 21/3423; G01C 21/3461; G01C 21/3491; G06F 16/29; G05D 1/0088; B60G 2800/964; B60K 2370/166; B60W 2556/50; B64C 2201/141; G06G 7/78
See application file for complete search history.

(56) References Cited

U.S. PATENT DOCUMENTS

| 8,751,077 B2 * | 6/2014 | Hiruta | B60L 53/665 |
| | | | 701/22 |
| 9,507,346 B1 * | 11/2016 | Levinson | G05D 1/0291 |
| 10,444,755 B2 * | 10/2019 | Kuroda | G05D 1/0088 |

(Continued)

FOREIGN PATENT DOCUMENTS

| CN | 105865466 | 8/2016 |
| CN | 108803607 | 11/2018 |

(Continued)

OTHER PUBLICATIONS

PCT International Search Report regarding International Application No. PCT/US2018/067531, dated Apr. 23, 2019, 8 pages.

(Continued)

*Primary Examiner* — Ig T An
(74) *Attorney, Agent, or Firm* — Knobbe, Martens, Olson & Bear LLP

(57) ABSTRACT

Technologies are disclosed that are used to control the transmission and processing of vehicle telemetry data. Routing data configured to be used to navigate the vehicle is accessed. Using the routing data, telemetry broadcast parameters are generated. The telemetry broadcast parameters are transmitted to the vehicle. Transmissions of telemetry data in accordance with the broadcast parameters are received from the vehicle. The received telemetry data is used in generating a simulated environment for a route planning learning engine, in simulating a vehicle, in validating routes and maps, and/or in performing vehicle diagnostics.

29 Claims, 10 Drawing Sheets

(56) References Cited

U.S. PATENT DOCUMENTS

| | | | | |
|---|---|---|---|---|
| 10,453,150 | B2* | 10/2019 | Thompson | G06Q 10/10 |
| 10,504,052 | B2* | 12/2019 | Sugioka | G01C 21/3415 |
| 10,515,321 | B2* | 12/2019 | Zhu | B60W 40/04 |
| 2009/0140887 | A1* | 6/2009 | Breed | G01S 17/86 340/990 |
| 2015/0254986 | A1* | 9/2015 | Fairfield | G08G 1/161 707/687 |
| 2016/0132705 | A1* | 5/2016 | Kovarik | E01F 9/578 340/10.3 |
| 2017/0067750 | A1* | 3/2017 | Day | B60G 17/015 |
| 2017/0123421 | A1* | 5/2017 | Kentley | G08G 1/202 |
| 2017/0123429 | A1* | 5/2017 | Levinson | G01C 21/34 |
| 2017/0139409 | A1* | 5/2017 | Clarke | G08G 5/0082 |
| 2017/0309171 | A1* | 10/2017 | Zhao | G01S 19/13 |
| 2017/0309172 | A1 | 10/2017 | Linder | |
| 2017/0337813 | A1* | 11/2017 | Taylor | G08G 1/0965 |
| 2017/0356746 | A1* | 12/2017 | Iagnemma | G01C 21/34 |
| 2018/0238697 | A1 | 8/2018 | Maru et al. | |
| 2018/0238698 | A1* | 8/2018 | Pedersen | G01C 21/3492 |
| 2018/0257643 | A1* | 9/2018 | Kroop | B60W 30/09 |
| 2018/0375568 | A1* | 12/2018 | De Rosa | H04W 72/04 |
| 2019/0369616 | A1* | 12/2019 | Ostafew | G01C 21/3658 |
| 2019/0369626 | A1* | 12/2019 | Lui | G06F 30/20 |
| 2020/0209002 | A1* | 7/2020 | Hou | G05D 1/0221 |

FOREIGN PATENT DOCUMENTS

| | | |
|---|---|---|
| WO | WO 2016/090282 A1 | 6/2016 |
| WO | WO 2017/218563 A1 | 12/2017 |

OTHER PUBLICATIONS

PCT International Search Report and Written Opinion, regarding International Application No. PCT/US2018/067547, dated May 23, 2019, 9 pages.

* cited by examiner

SYSTEMS AND METHODS FOR VEHICLE TELEMETRY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Vehicles—such as vehicles used for ride-sharing purposes, vehicles that provide driver-assist functionality, and/or automated or autonomous vehicles (AVs)—may obtain and process sensor data using an on-board data processing system to perform a variety of functions. For example, functions can include determining and/or displaying navigational routes, identifying road signs, detecting objects and/or road obstructions, controlling vehicle operation, and/or the like.

Autonomous vehicles will radically change and ease transportation. However, for autonomous vehicles to reach their full potential, autonomous vehicles need to be able to navigate safely even in a dynamically changing environment.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to advance generation of alternative routes. According to one aspect, an initial route may be generated for an autonomous vehicle. In addition, one or more of the alternative routes may be generated corresponding to different nodes on the initial route. One or more of the alternative routes may be downloaded to the autonomous vehicle in conjunction with the initial route. In response to detecting that the environment is such that it is impossible or disadvantageous to continue using the initial route at a given route node, the corresponding alternative route may be identified and selected. The vehicle may then be driven using the alternative route.

Another aspect of the present disclosure relates to the efficient transmission of autonomous vehicle telemetry data, such as vehicle position and sensor data. Such autonomous vehicle telemetry data may be used to perform error correction, diagnostics, route validation, map validation, vehicle simulation, routing simulation, and the training of a route planning learning engine.

DETAILED DESCRIPTION

Figure 1A:
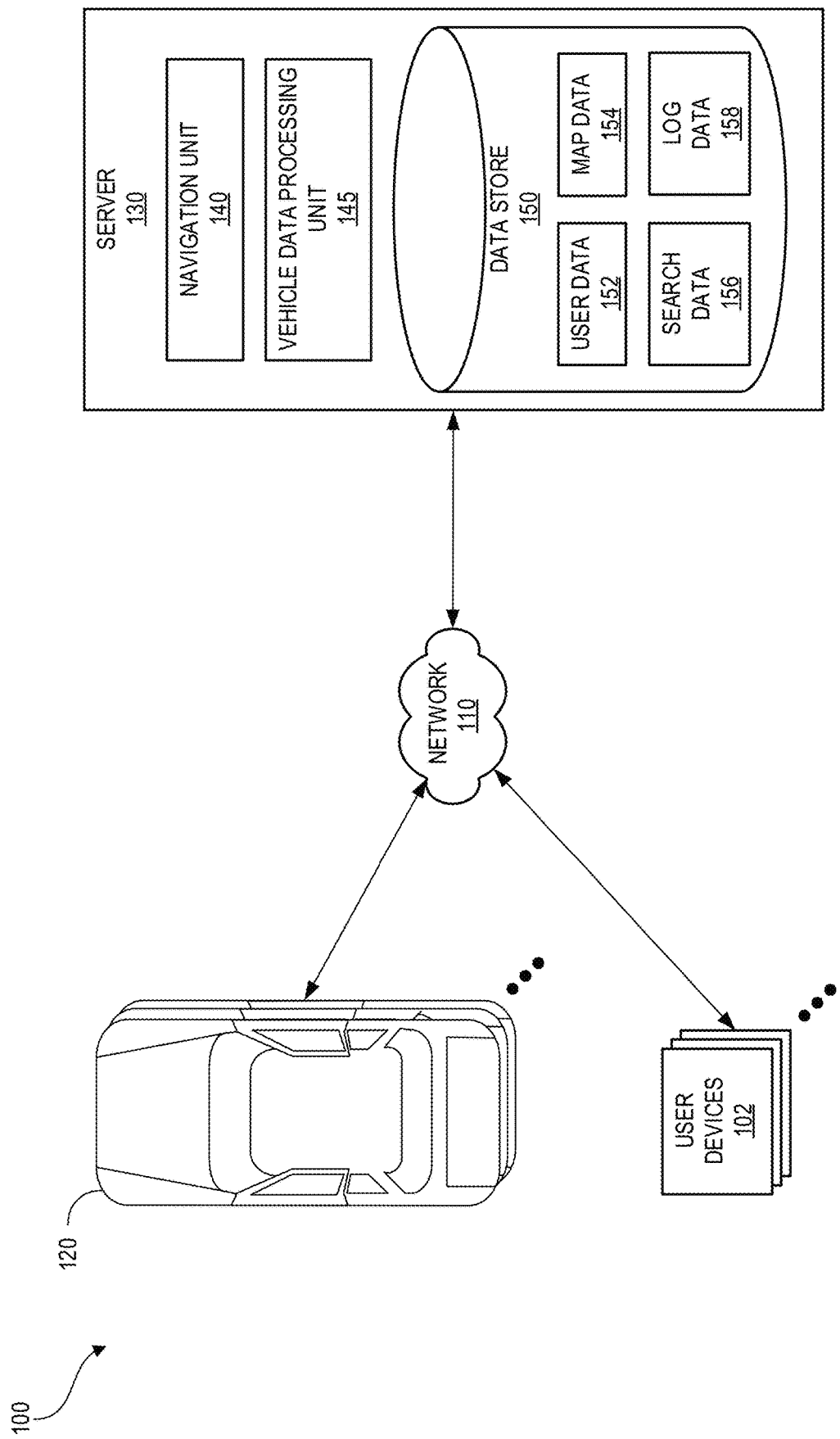
FIG. 1A illustrates a block diagram of a networked vehicle environment in which one or more vehicles and/or one or more user devices interact with a server via a network, according to one embodiment.

As discussed above, for autonomous vehicles to reach their full potential, it is essential that autonomous vehicles are able to navigate safely even in a changing environment and even when such a change in environment may prevent the vehicle from proceeding on its planned route. For example, an autonomous vehicle should be able to accommodate a sudden road closure, lane blockage, train passage, the passage of emergency or police vehicles, flooding, and/or other dynamic conditions in a safe manner that still enables a passenger to reach the original designated destination.

Conventionally, when a user wishes to use an autonomous vehicle to be transported to a destination, the user provides a destination. A vehicle route planning system will plan a travel route from a beginning point to the destination. However, if the vehicle is unable to follow the planned travel route from initiation location to destination (e.g., due to an accident or street blockage) the vehicle may request that a new route be generated. However, depending on the circumstances, the delay in responding to the route interruption while waiting for a new route to be generated may result in an unsafe condition or missed opportunities for taking the most efficient new route. Alternatively, if the autonomous vehicle is unable to follow the planned travel route, conventionally, the vehicle may simply stop and/or require that a human take over the driving of the autonomous vehicle.

Disclosed herein are methods and systems for dynamically adapting routing to accommodate a dynamically changing environment using pre-generated alternative routes. As will be described, an initial route may be generated for an autonomous vehicle. In addition, one or more of the alternative routes may be generated corresponding to different points on the initial route. One or more of the alternative routes may be downloaded to the autonomous vehicle in conjunction with the initial route. In response to detecting that the environment is such that it is impossible or disadvantageous to continue using the initial route at a given route point, the corresponding alternative route may be identified and selected. The vehicle may then be driven using the corresponding alternative route.

Further, in order to improve the safe and efficient operation of autonomous vehicles, it is useful to be able to collect and analyze telemetry data from large numbers of autonomous vehicles that are in actual operation. Such data may be used to identify and rectify vehicle errors or faults, validate mapping data, and/or to improve the future routing of autonomous vehicles. Thus, disclosed herein are methods and systems for the transmission and utilization of autonomous vehicle position and sensor data for error correction, diagnostics, validation, simulation and the training of a route planning learning engine.

Detailed descriptions and examples of systems and methods according to one or more illustrative embodiments of the present disclosure may be found in the sections entitled Safe Route Planning For An Autonomous Vehicle and Autonomous Vehicle Telemetry, as well as in the section entitled Example Embodiments, and also in FIGS. 1C-7 herein. Furthermore, components and functionality for safe route planning and autonomous vehicle telemetry may be configured and/or incorporated into the networked vehicle environment 100 described herein in FIGS. 1A-1B.

Various embodiments described herein are intimately tied to, enabled by, and would not exist except for, computer technology. For example, the generation of alternative routes, and the use of such alternative routes in controlling an autonomous vehicle in response to sensor data described herein in reference to various embodiments cannot reasonably be performed by humans alone, without the computer technology upon which they are implemented. Similarly, the efficient broadcast of autonomous vehicle telemetry data, and the use of such telemetry data for component failure detection, vehicle simulation, route planning simulation, among other uses described herein in reference to various embodiments cannot reasonably be performed by humans alone, without the computer technology upon which they are implemented.

Networked Vehicle Environment

FIG. 1A illustrates a block diagram of a networked vehicle environment 100 in which one or more vehicles 120 and/or one or more user devices 102 interact with a server 130 via a network 110, according to one embodiment. For example, the vehicles 120 may be equipped to provide ride-sharing and/or other location-based services, to assist drivers in controlling vehicle operation (e.g., via various driver-assist features, such as adaptive and/or regular cruise control, adaptive headlight control, anti-lock braking, automatic parking, night vision, blind spot monitor, collision avoidance, crosswind stabilization, driver drowsiness detection, driver monitoring system, emergency driver assistant, intersection assistant, hill descent control, intelligent speed adaptation, lane centering, lane departure warning, forward, rear, and/or side parking sensors, pedestrian detection, rain sensor, surround view system, tire pressure monitor, traffic sign recognition, turning assistant, wrong-way driving warning, traffic condition alerts, etc.), and/or to fully control vehicle operation. Thus, the vehicles 120 can be regular gasoline, natural gas, biofuel, electric, hydrogen, etc. vehicles configured to offer ride-sharing and/or other location-based services, vehicles that provide driver-assist functionality (e.g., one or more of the driver-assist features described herein), and/or automated or autonomous vehicles (AVs). The vehicles 120 can be automobiles, trucks, vans, buses, motorcycles, scooters, bicycles, and/or any other motorized vehicle.

The server 130 can communicate with the vehicles 120 to obtain vehicle data, such as route data, sensor data, perception data, vehicle 120 control data, vehicle 120 component fault and/or failure data, etc. The server 130 can process and store the vehicle data for use in other operations performed by the server 130 and/or another computing system (not shown). Such operations can include running diagnostic models to identify vehicle 120 operational issues (e.g., the cause of vehicle 120 navigational errors, unusual sensor readings, an object not being identified, vehicle 120 component failure, etc.); running models to simulate vehicle 120 performance given a set of variables; identifying objects that cannot be identified by a vehicle 120, generating control instructions that, when executed by a vehicle 120, cause the vehicle 120 to drive and/or maneuver in a certain manner along a specified path; and/or the like.

The server 130 can also transmit data to the vehicles 120. For example, the server 130 can transmit map data, firmware and/or software updates, vehicle 120 control instructions, an identification of an object that could not otherwise be identified by a vehicle 120, passenger pickup information, traffic data, and/or the like.

In addition to communicating with one or more vehicles 120, the server 130 can communicate with one or more user devices 102. In particular, the server 130 can provide a network service to enable a user to request, via an application running on a user device 102, location-based services (e.g., transportation services, such as ride-sharing services). For example, the user devices 102 can correspond to a computing device, such as a smart phone, tablet, laptop, smart watch, or any other device that can communicate over the network 110 with the server 130. In the embodiment, a user device 102 executes an application, such as a mobile application, that the user operating the user device 102 can use to interact with the server 130. For example, the user device 102 can communicate with the server 130 to provide location data and/or queries to the server 130, to receive map-related data and/or directions from the server 130, and/or the like.

The server 130 can process requests and/or other data received from user devices 102 to identify service providers (e.g., vehicle 120 drivers) to provide the requested services for the users. In addition, the server 130 can receive data—such as user trip pickup or destination data, user location query data, etc.—based on which the server 130 identifies a region, an address, and/or other location associated with the various users. The server 130 can then use the identified location to provide services providers and/or users with directions to a determined pickup location.

The application running on the user device 102 may be created and/or made available by the same entity responsible for the server 130. Alternatively, the application running on the user device 102 can be a third-party application that includes features (e.g., an application programming interface or software development kit) that enables communications with the server 130.

A single server 130 is illustrated in FIG. 1A for simplicity and ease of explanation. It is appreciated, however, that the server 130 may be a single computing device, or may include multiple distinct computing devices logically or physically grouped together to collectively operate as a server system. The components of the server 130 can be implemented in application-specific hardware (e.g., a server computing device with one or more ASICs) such that no software is necessary, or as a combination of hardware and software. In addition, the modules and components of the server 130 can be combined on one server computing device or separated individually or into groups on several server computing devices. In some embodiments, the server 130 may include additional or fewer components than illustrated in FIG. 1A.

The network 110 includes any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The server 130 can include a navigation unit 140, a vehicle data processing unit 145, and a data store 150. The navigation unit 140 can assist with location-based services. For example, the navigation unit 140 can facilitate the transportation of a user (also referred to herein as a "rider") and/or an object (e.g., food, packages, etc.) by another user (also referred to herein as a "driver") from a first location (also referred to herein as a "pickup location") to a second location (also referred to herein as a "destination location"). The navigation unit 140 may facilitate user and/or object transportation by providing map and/or navigation instructions to an application running on a user device 102 of a rider, to an application running on a user device 102 of a driver, and/or to a navigational system running on a vehicle 120.

As an example, the navigation unit 140 can include a matching service (not shown) that pairs a rider requesting a trip from a pickup location to a destination location with a driver that can complete the trip. The matching service may interact with an application running on the user device 102 of the rider and/or an application running on the user device 102 of the driver to establish the trip for the rider and/or to process payment from the rider to the driver.

The navigation unit 140 can also communicate with the application running on the user device 102 of the driver during the trip to obtain trip location information from the user device 102 (e.g., via a global position system (GPS) component coupled to and/or embedded within the user device 102) and provide navigation directions to the application that aid the driver in traveling from the current location of the driver to the destination location. The navigation unit 140 can also direct the driver to various geographic locations or points of interest, regardless of whether the driver is carrying a rider.

The vehicle data processing unit 145 can be configured to support vehicle 120 driver-assist features and/or to support autonomous driving. For example, the vehicle data processing unit 145 can generate and/or transmit to a vehicle 120 map data, run diagnostic models to identify vehicle 120 operational issues, run models to simulate vehicle 120 performance given a set of variables, use vehicle data provided by a vehicle 120 to identify an object and transmit an identification of the object to the vehicle 120, generate and/or transmit to a vehicle 120 vehicle 120 control instructions, and/or the like.

The data store 150 can store various types of data used by the navigation unit 140, the vehicle data processing unit 145, the user devices 102, and/or the vehicles 120. For example, the data store 150 can store user data 152, map data 154, search data 156, and log data 158.

The user data 152 may include information on some or all of the users registered with a location-based service, such as drivers and riders. The information may include, for example, usernames, passwords, names, addresses, billing information, data associated with prior trips taken or serviced by a user, user rating information, user loyalty program information, and/or the like.

The map data 154 may include high definition (HD) maps generated from sensors (e.g., light detection and ranging (LiDAR) sensors, radio detection and ranging (RADAR) sensors, infrared cameras, visible light cameras, stereo cameras, an inertial measurement unit (IMU), etc.), satellite imagery, optical character recognition (OCR) performed on captured street images (e.g., to identify names of streets, to identify street sign text, to identify names of points of interest, etc.), etc.; information used to calculate routes; information used to render 2D and/or 3D graphical maps; and/or the like. For example, the map data 154 can include elements like the layout of streets and intersections, bridges (e.g., including information on the height and/or width of bridges over streets), off-ramps, buildings, parking structure entrances and exits (e.g., including information on the height and/or width of the vehicle entrances and/or exits), the placement of street signs and stop lights, emergency turn-offs, points of interest (e.g., parks, restaurants, fuel stations, attractions, landmarks, etc., and associated names), road markings (e.g., centerline markings dividing lanes of opposing traffic, lane markings, stop lines, left turn guide lines, right turn guide lines, crosswalks, bus lane markings, bike lane markings, island marking, pavement text, highway exist and entrance markings, etc.), curbs, rail lines, waterways, turning radiuses and/or angles of left and right turns, the distance and dimensions of road features, the placement of barriers between two-way traffic, and/or the like, along with the elements' associated geographical locations (e.g., geographical coordinates). The map data 154 can also include reference data, such as real-time and/or historical traffic information, current and/or predicted weather conditions, road work information, information regarding laws and regulations (e.g., speed limits, whether right turns on red lights are permitted or prohibited, whether U-turns are permitted or prohibited, permitted direction of travel, and/or the like), news events, and/or the like.

While the map data 154 is illustrated as being stored in the data store 150 of the server 130, this is not meant to be limiting. For example, the server 130 can transmit the map data 154 to a vehicle 120 for storage therein (e.g., in the data store 129, described below).

The search data 156 can include searches entered by various users in the past. For example, the search data 156 can include textual searches for pickup and/or destination locations. The searches can be for specific addresses, geographical locations, names associated with a geographical location (e.g., name of a park, restaurant, fuel station, attraction, landmark, etc.), etc.

The log data 158 can include vehicle data provided by one or more vehicles 120. For example, the vehicle data can include route data, sensor data, perception data, vehicle 120 control data, vehicle 120 component fault and/or failure data, etc.

Figure 1B:
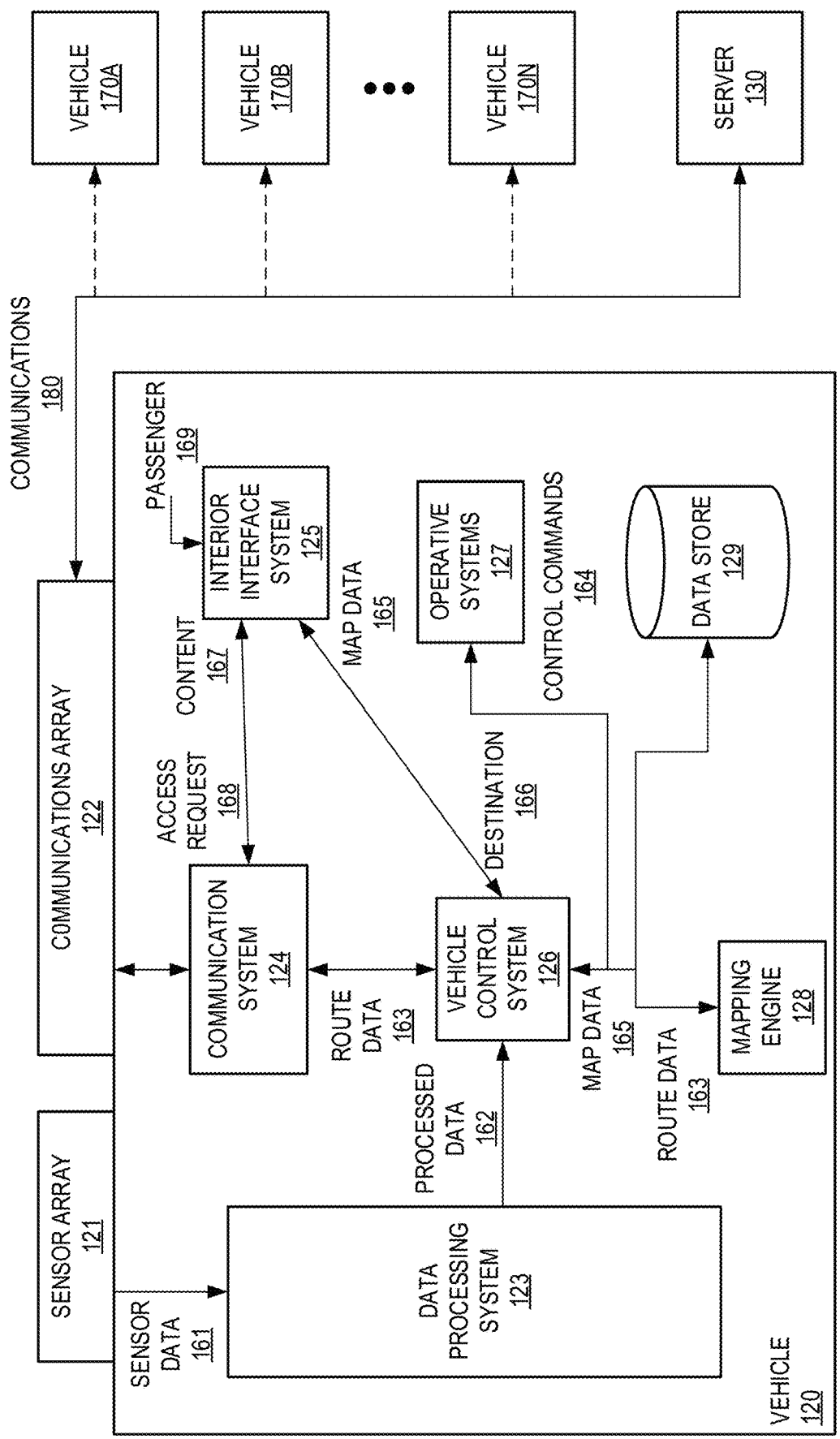
FIG. 1B illustrates a block diagram showing the vehicle of FIG. 1A in communication with one or more other vehicles and/or the server of FIG. 1A, according to one embodiment.

FIG. 1B illustrates a block diagram showing the vehicle 120 of FIG. 1A in communication with one or more other vehicles 170A-N and/or the server 130 of FIG. 1A, according to one embodiment. As illustrated in FIG. 1B, the vehicle 120 can include various components and/or data stores. For example, the vehicle 120 can include a sensor array 121, a communications array 122, a data processing system 123, a communication system 124, an interior interface system 125, a vehicle control system 126, operative systems 127, a mapping engine 128, and/or a data store 129.

Communications 180 may be transmitted and/or received between the vehicle 120, one or more vehicles 170A-N, and/or the server 130. The server 130 can transmit and/or receive data from the vehicle 120 as described above with respect to FIG. 1A. For example, the server 130 can transmit vehicle control instructions or commands (e.g., as communications 180) to the vehicle 120. The vehicle control instructions can be received by the communications array 122 (e.g., an array of one or more antennas configured to transmit and/or receive wireless signals), which is operated by the communication system 124 (e.g., a transceiver). The communication system 124 can transmit the vehicle control instructions to the vehicle control system 126, which can operate the acceleration, steering, braking, lights, signals, and other operative systems 127 of the vehicle 120 in order to drive and/or maneuver the vehicle 120 and/or assist a driver in driving and/or maneuvering the vehicle 120 through road traffic to destination locations specified by the vehicle control instructions.

As an example, the vehicle control instructions can include route data 163, which can be processed by the vehicle control system 126 to maneuver the vehicle 120 and/or assist a driver in maneuvering the vehicle 120 along a given route (e.g., an optimized route calculated by the server 130 and/or the mapping engine 128) to the specified destination location. In processing the route data 163, the vehicle control system 126 can generate control commands 164 for execution by the operative systems 127 (e.g., acceleration, steering, braking, maneuvering, reversing, etc.) to cause the vehicle 120 to travel along the route to the destination location and/or to assist a driver in maneuvering the vehicle 120 along the route to the destination location.

A destination location 166 may be specified by the server 130 based on user requests (e.g., pickup requests, delivery requests, etc.) transmitted from applications running on user devices 102. Alternatively or in addition, a passenger and/or driver of the vehicle 120 can provide user input(s) 169 through an interior interface system 125 (e.g., a vehicle navigation system) to provide a destination location 166. In some embodiments, the vehicle control system 126 can transmit the inputted destination location 166 and/or a current location of the vehicle 120 (e.g., as a GPS data packet) as a communication 180 to the server 130 via the communication system 124 and the communications array 122. The server 130 (e.g., the navigation unit 140) can use the current location of the vehicle 120 and/or the inputted destination location 166 to perform an optimization operation to determine an optimal route for the vehicle 120 to travel to the destination location 166. Route data 163 that includes the optimal route can be transmitted from the server 130 to the vehicle control system 126 via the communications array 122 and the communication system 124. As a result of receiving the route data 163, the vehicle control system 126 can cause the operative systems 127 to maneuver the vehicle 120 through traffic to the destination location 166 along the optimal route, assist a driver in maneuvering the vehicle 120 through traffic to the destination location 166 along the optimal route, and/or cause the interior interface system 125 to display and/or present instructions for maneuvering the vehicle 120 through traffic to the destination location 166 along the optimal route.

Alternatively or in addition, the route data 163 includes the optimal route and the vehicle control system 126 automatically inputs the route data 163 into the mapping engine 128. The mapping engine 128 can generate map data 165 using the optimal route (e.g., generate a map showing the optimal route and/or instructions for taking the optimal route) and provide the map data 165 to the interior interface system 125 (e.g., via the vehicle control system 126) for display. The map data 165 may include information derived from the map data 154 stored in the data store 150 on the server 130. The displayed map data 165 can indicate an estimated time of arrival and/or show the progress of the vehicle 120 along the optimal route. The displayed map data 165 can also include indicators, such as reroute commands, emergency notifications, road work information, real-time traffic data, current weather conditions, information regarding laws and regulations (e.g., speed limits, whether right turns on red lights are permitted or prohibited, where U-turns are permitted or prohibited, permitted direction of travel, etc.), news events, and/or the like.

The user input 169 can also be a request to access a network (e.g., the network 110). In response to such a request, the interior interface system 125 can generate an access request 168, which can be processed by the communication system 124 to configure the communications array 122 to transmit and/or receive data corresponding to a user's interaction with the interior interface system 125 and/or with a user device 102 in communication with the interior interface system 125 (e.g., a user device 102 connected to the interior interface system 125 via a wireless connection). For example, the vehicle 120 can include on-board Wi-Fi, which the passenger(s) and/or driver can access to send and/or receive emails and/or text messages, stream audio and/or video content, browse content pages (e.g., network pages, web pages, etc.), and/or access applications that use network access. Based on user interactions, the interior interface system 125 can receive content 167 via the network 110, the communications array 122, and/or the communication system 124. The communication system 124 can dynamically manage network access to avoid or minimize disruption of the transmission of the content 167.

The sensor array 121 can include any number of one or more types of sensors, such as a satellite-radio navigation system (e.g., GPS), a LiDAR sensor, a landscape sensor (e.g., a radar sensor), an IMU, a camera (e.g., an infrared camera, a visible light camera, stereo cameras, etc.), a Wi-Fi detection system, a cellular communication system, an inter-vehicle communication system, a road sensor communication system, feature sensors, proximity sensors (e.g., infrared, electromagnetic, photoelectric, etc.), distance sensors, depth sensors, and/or the like. The satellite-radio navigation system may compute the current position (e.g., within a range of 1-10 meters) of the vehicle 120 based on an analysis of signals received from a constellation of satellites.

The LiDAR sensor, the radar sensor, and/or any other similar types of sensors can be used to detect the vehicle 120 surroundings while the vehicle 120 is in motion or about to begin motion. For example, the LiDAR sensor may be used to bounce multiple laser beams off approaching objects to assess their distance and to provide accurate 3D information on the surrounding environment. The data obtained from the LiDAR sensor may be used in performing object identification, motion vector determination, collision prediction, and/or in implementing accident avoidance processes. Optionally, the LiDAR sensor may provide a 360° view using a rotating, scanning mirror assembly. The LiDAR sensor may optionally be mounted on a roof of the vehicle 120.

The IMU may include X, Y, Z oriented gyroscopes and/or accelerometers. The IMU provides data on the rotational and linear motion of the vehicle 120, which may be used to calculate the motion and position of the vehicle 120.

Cameras may be used to capture visual images of the environment surrounding the vehicle 120. Depending on the configuration and number of cameras, the cameras may provide a 360° view around the vehicle 120. The images from the cameras may be used to read road markings (e.g., lane markings), read street signs, detect objects, and/or the like.

The Wi-Fi detection system and/or the cellular communication system may be used to perform triangulation with respect to Wi-Fi hot spots or cell towers respectively, to determine the position of the vehicle 120 (optionally in conjunction with then satellite-radio navigation system).

The inter-vehicle communication system (which may include the Wi-Fi detection system, the cellular communication system, and/or the communications array 122) may be used to receive and/or transmit data to the other vehicles 170A-N, such as current speed and/or location coordinates of the vehicle 120, time and/or location coordinates corresponding to when deceleration is planned and the planned rate of deceleration, time and/or location coordinates when a stop operation is planned, time and/or location coordinates when a lane change is planned and direction of lane change, time and/or location coordinates when a turn operation is planned, time and/or location coordinates when a parking operation is planned, and/or the like.

The road sensor communication system (which may include the Wi-Fi detection system and/or the cellular communication system) may be used to read information from road sensors (e.g., indicating the traffic speed and/or traffic congestion) and/or traffic control devices (e.g., traffic signals).

When a user requests transportation (e.g., via the application running on the user device 102), the user may specify a specific destination location. The origination location may be the current location of the vehicle 120, which may be determined using the satellite-radio navigation system installed in the vehicle (e.g., GPS, Galileo, BeiDou/COMPASS, DORIS, GLONASS, and/or other satellite-radio navigation system), a Wi-Fi positioning System, cell tower triangulation, and/or the like. Optionally, the origination location may be specified by the user via a user interface provided by the vehicle 120 (e.g., the interior interface system 125) or via the user device 102 running the application. Optionally, the origination location may be automatically determined from location information obtained from the user device 102. In addition to the origination location and destination location, one or more waypoints may be specified, enabling multiple destination locations.

Raw sensor data 161 from the sensor array 121 can be processed by the on-board data processing system 123. The processed data 162 can then be sent by the data processing system 123 to the vehicle control system 126, and optionally sent to the server 130 via the communication system 124 and the communications array 122.

The data store 129 can store map data (e.g., the map data 154) and/or a subset of the map data 154 (e.g., a portion of the map data 154 corresponding to a general region in which the vehicle 120 is currently located). In some embodiments, the vehicle 120 can use the sensor array 121 to record update map data along traveled routes, and transmit the updated map data to the server 130 via the communication system 124 and the communications array 122. The server 130 can then transmit the updated map data to one or more of the vehicles 170A-N and/or further process the updated map data.

The data processing system 123 can provide continuous or near continuous processed data 162 to the vehicle control system 126 to respond to point-to-point activity in the surroundings of the vehicle 120. The processed data 162 can comprise comparisons between the raw sensor data 161—which represents an operational environment of the vehicle 120, and which is continuously collected by the sensor array 121—and the map data stored in the data store 129. In an example, the data processing system 123 is programmed with machine learning or other artificial intelligence capabilities to enable the vehicle 120 to identify and respond to conditions, events, and/or potential hazards. In variations, the data processing system 123 can continuously or nearly continuously compare raw sensor data 161 to stored map data in order to perform a localization to continuously or nearly continuously determine a location and/or orientation of the vehicle 120. Localization of the vehicle 120 may allow the vehicle 120 to become aware of an instant location and/or orientation of the vehicle 120 in comparison to the stored map data in order to maneuver the vehicle 120 on surface streets through traffic and/or assist a driver in maneuvering the vehicle 120 on surface streets through traffic and identify and respond to potential hazards (e.g., pedestrians) or local conditions, such as weather or traffic conditions.

Furthermore, localization can enable the vehicle 120 to tune or beam steer the communications array 122 to maximize a communication link quality and/or to minimize interference with other communications from other vehicles 170A-N. For example, the communication system 124 can beam steer a radiation patterns of the communications array 122 in response to network configuration commands received from the server 130. The data store 129 may store current network resource map data that identifies network base stations and/or other network sources that provide network connectivity. The network resource map data may indicate locations of base stations and/or available network types (e.g., 3G, 4G, LTE, Wi-Fi, etc.) within a region in which the vehicle 120 is located.

While FIG. 1B describes certain operations as being performed by the vehicle 120 or the server 130, this is not meant to be limiting. The operations performed by the vehicle 120 and the server 130 as described herein can be performed by either entity. For example, certain operations normally performed by the server 130 (e.g., transmitting updating map data to the vehicles 170A-N) may be performed by the vehicle 120 for load balancing purposes (e.g., to reduce the processing load of the server 130, to take advantage of spare processing capacity on the vehicle 120, etc.).

Furthermore, any of the vehicles 170A-N may include some or all of the components of the vehicle 120 described herein. For example, a vehicle 170A-N can include a communications array 122 to communicate with the vehicle 120 and/or the server 130.

which is immediately available. Thus, the autonomous vehicle may continue to be safely navigated without having to wait for a new route to be generated.

Following is an example table of timing options for the advance generation of alternative routes, where alternative routes are generated in anticipation of a possible future need. In the following table the phrase "node" corresponds to a navigation event (e.g., a turn, entering an on-ramp, exiting an off-ramp, parking, lane change and/or the like). The phrase "exception event" refers to an event that necessitates or makes desirable a departure from a current route.

TABLE 1

| STRATEGY | ALTERNATIVE ROUTE ADVANCE GENERATION |
| --- | --- |
| 1 | No advance generation of alternative routes (alternative routes generated in response to detected exception event) |
| 2 | Generate alternative routes for each node of initial route |
| 3 | Generate alternative routes for each node of initial route and n-tiers of alternative routes |
| 4 | Generate alternative routes for each node of initial route associated with a threshold probability of an exception event |
| 5 | Generate alternative routes for each node of initial route and n-tiers of alternative routes with a threshold probability of an exception event |
| 6 | Generate alternative routes for each node of initial route associated with a threshold weight |
| 7 | Generate alternative routes for each node of initial route and n-tiers of alternative routes with a threshold weight |
| 8 | Determine whether alternative route is to be generated for a given node of initial route based on associated weight and probability of exception event |
| 9 | Determine whether alternative route is to be generated for a given node of initial route and n-tiers of alternative routes based on associated weight and probability of exception event |

Safe Route Planning for an Autonomous Vehicle

At times, while the autonomous vehicle is executing an initial generated route, the vehicle, via one or more of its sensors, may identify an actual or potential environmental (e.g., road) condition that may necessitate or make advantageous a deviation from the initial route. For example, the initial route may specify that the vehicle is to change lanes from a middle lane to a right turn lane, and is to make a right turn at a specified intersection. However, if one or more of the vehicles sensors (e.g., LiDAR, Radar, and/or camera sensors) indicate that the right turn lane is backed up and it is not possible to safely merge into the right turn lane, it may be necessary to modify the route.

It would be advantageous to have an alternative route pre-generated and immediately available so that the autonomous vehicle may quickly and safely respond to conditions that necessitate a route change, without violating driving regulations and without causing a collision.

Several different techniques may be used in determining when to generate alternative routes and for which points in a route alternative routes should be calculated. Certain techniques may be selected to reduce the upfront processing load and memory utilization by reducing the total number of alternative routes that are pre-generated, while still ensuring safe autonomous vehicle operation.

For example, prior to the vehicle beginning traversal of the original route, corresponding alternative routes may be generated for selected or all turns and other navigation events included in the original route. Then, if the autonomous vehicle determines it is unable to safely continue following the initial route (e.g., make a given turn, lane change, entrance, or exit in the initial route), the vehicle may select the corresponding already-generated alternative route, Various trade-offs may be considered in taking into account which of the foregoing strategies to select for the advance generation of alternative routes. For example, the greater the number of alternative routes generated, the higher the likelihood of having an alternative route immediately available when needed, but the greater the loading on the route generation processing system and the greater the memory utilization for storing such alternative routes. The technique may be selected based on a determined likelihood of an exception event occurring along a route as a whole, the determined likelihood of an exception event occurring on a per node basis, and/or on a weighting assigned to a node or node type.

With reference to certain strategies above, the data for determining the likelihood (e.g., the probability) of an exception event may include some or all of the following: geographical region of navigation, time of day, projected congestion, historical exception events for corresponding nodes at the time of day when the initial route is scheduled for, population density of the geographical region of navigation, presence and location of traffic control devices (e.g., street lights and stop signs), weather, vehicle memory capacity for storing routes, vehicle density of the geographical region of navigation, other reference data discussed herein, and/or the like.

With respect to strategy 1, in order to minimize the amount of processing and memory utilization, alternative routes may only be generated in response to a detected exception event rather than being generated in advance. Example detected exception events may include blockage of a lane the vehicle was to navigate to according to the current route, blockage of a turn the vehicle was to make according to the current route, blockage of an on-ramp or off-ramp the vehicle was to navigate to according to the current route, a pull-over commanded by a responder vehicle or operator (e.g., a police vehicle, fire engine, ambulance, and the like), closure of a parking lot the vehicle was to park in, and/or the like. Strategy 1 may be selected, for example, when the initial route is expected to have a relatively low probability of exception events as determined using the data discussed above, or when the vehicle does not have sufficient memory available to store large numbers of alternative routes. A given alternative route may begin at the point or node corresponding to the detected exception event.

With respect to strategy 2, alternative routes for each node of the initial route may be generated in advance. If the probability of having no more than one exception event for the route as a whole is low, then strategy 2 will ensure that it is highly likely that no alternative routes will need to be generated on demand.

With respect to strategy 3, alternative routes for each node of the initial route may be generated in advance, and alternative routes for the nodes of n-tiers deep of alternative routes may be generated in advance. Strategy 3 may be used when there is a high probability of exception events (e.g., which may occur in the event of large scale road construction projects along the route and in the area surrounding the route, in the event of a natural disaster in the area of the route, in the event of a festival or sporting event in the area of the route, etc.), or where the autonomous vehicle is performing a mission critical function (e.g., an ambulance taking an injured person to a hospital, a fire engine responding to a reported fire, a police vehicle responding to a reported crime or accident, etc.).

With respect to strategy 4, which determines whether an alternative route is to be generated on a node-to-node basis, alternative routes for a given node of the initial route may be generated in advance if the probability of having an exception event for the given node exceeds a specified threshold. Strategy 4 balances the assurance of having an alternative route available in the event of an exception event that has more than a threshold possibility of occurring with the need to reduce processing and/or memory utilization for the generation and storage of alternative routes.

With respect to strategy 5, alternative routes for a given node of the initial route and for a given node of n-tiers deep of alternative routes may be generated in advance if the probability of having an exception event for the given node exceeds a specified threshold.

As noted above, different nodes or node types may be associated with different weights. The weights may reflect the importance of having an alternative route immediately available for safety. For example, if a node is an off-ramp exit of a highway where the vehicle may be traveling at high speed (e.g., 70 miles per hour), the vehicle may have little time to detect a blockage of the off-ramp and there may be little time to calculate and execute a new route. Hence, it may be more important to have an alternative route pre-calculated and immediately available in such a scenario than in the scenario of a vehicle driving in an area with a speed limit of 25 miles per hour. By way of further example, if a street has 3 lanes in each direction, and the vehicle is to transition from a right lane to a left turn lane, such a node may be associated with a higher weight than a node associated with a road having single lane in each direction, where the vehicle is to make a left turn. Thus, for example, different node weights may be associated with different size intersections, different width streets, different expected vehicle speed, different expected congestion, nodes having different traffic control devices (e.g., traffic lights, stop lights, etc.), and the like.

With respect to strategy 6, alternative routes for a given node of the initial route may be generated in advance if the associated weight exceeds a specified threshold.

With respect to strategy 7, alternative routes for a given node of the initial route and for a given node of n-tiers deep of alternative routes may be generated in advance if the associated weight for the given node exceeds a specified threshold.

With respect to strategy 8, a determination is made as to whether an alternative route is to be generated in advance for a given node of initial route based on a combination of the associated weight and the associated probability of exception event.

With respect to strategy 9, a determination is made as to whether an alternative route is to be generated in advance for a given node of initial route and n-tiers deep of alternative routes based on a combination of the associated weight and the associated probability of exception event.

A given alternative route may be stored in a data store remote from the vehicle and may be downloaded to the vehicle as soon as the vehicle is available to receive the alternative route (e.g., is connected to a network and has memory available to receive the alternative route), in response to the vehicle detecting an exception event (an environmental condition that prevents the vehicle proceeding along the route or that would render proceeding along the route to be unsafe), and/or based on other triggering conditions.

Thus, for example, while driving according to an initial route, the vehicle navigation system may detect an exception event or potential exception event at a given node. For example, a threshold exception event detection distance may be set before a given node, globally for all nodes, for all nodes of a certain type (e.g., turns, parking, entering on-ramp, exiting off-ramp), or where the vehicle is expected to be traveling at a certain speed (where the threshold distance may be proportional or otherwise correspond to the vehicle speed). No later than the threshold distance from an upcoming node, the navigation system will determine, via sensor readings, whether an exception events is present or is likely to be present. If the navigation system determines an exception event is present or is likely to be present, the vehicle navigation system may determine if there is an alternative route available for the node by generating a search request including the unique node identifier. If the alternative route is available, the route may be accessed (e.g., accessed from local memory or downloaded from a remote data store and stored in local memory), and executed.

An alternative route may be generated using one or more routing strategies, based on one or more criteria (e.g., speed, distance, road types, number of turns, and/or the like). For example, the alternative route may be generated to minimize time to the next waypoint (which may be the final destination), minimize distance to the next waypoint, minimize use of highways, minimize use of toll roads, minimize number of turns needed to reach the next waypoint, or some combination of the foregoing factors, minimize processing bandwidth needed to calculate alternative route, and/or the like, where different criteria may be given different weights in generating an alternative route.

Certain alternative routes may be in the form of an emergency backup routing, which directs the vehicle to pull-over to and park at a nearby safe location (e.g., the side of a road, a parking lot, etc.). Such emergency backup routing may be utilized when there is a detected vehicle malfunction (e.g., a flat tire) or in response to a pull-over command issued remotely to the vehicle (e.g., by a responder vehicle (e.g., a police vehicle, fire engine, ambulance, and the like) or other remote system.

In addition to pre-generating routes and to generating routes on demand in response to request from a given vehicle, updates to routes may be generated based on changing conditions detected by a remote route planning system (e.g., navigation unit 140). For example, the route planning system may receive a report from another vehicle or from a traffic reporting service regarding unexpected congestion or an accident. The route planning system may determine the given vehicle's current position using position information received from the vehicle, and using the vehicle's current position, generate an updated route from the vehicle's current position to avoid the congestion or accident. The route planning system may then transmit the updated route to the vehicle navigation system for execution.

Certain aspects will now be discussed with reference FIGS. 2A-6.

Figure 2A:
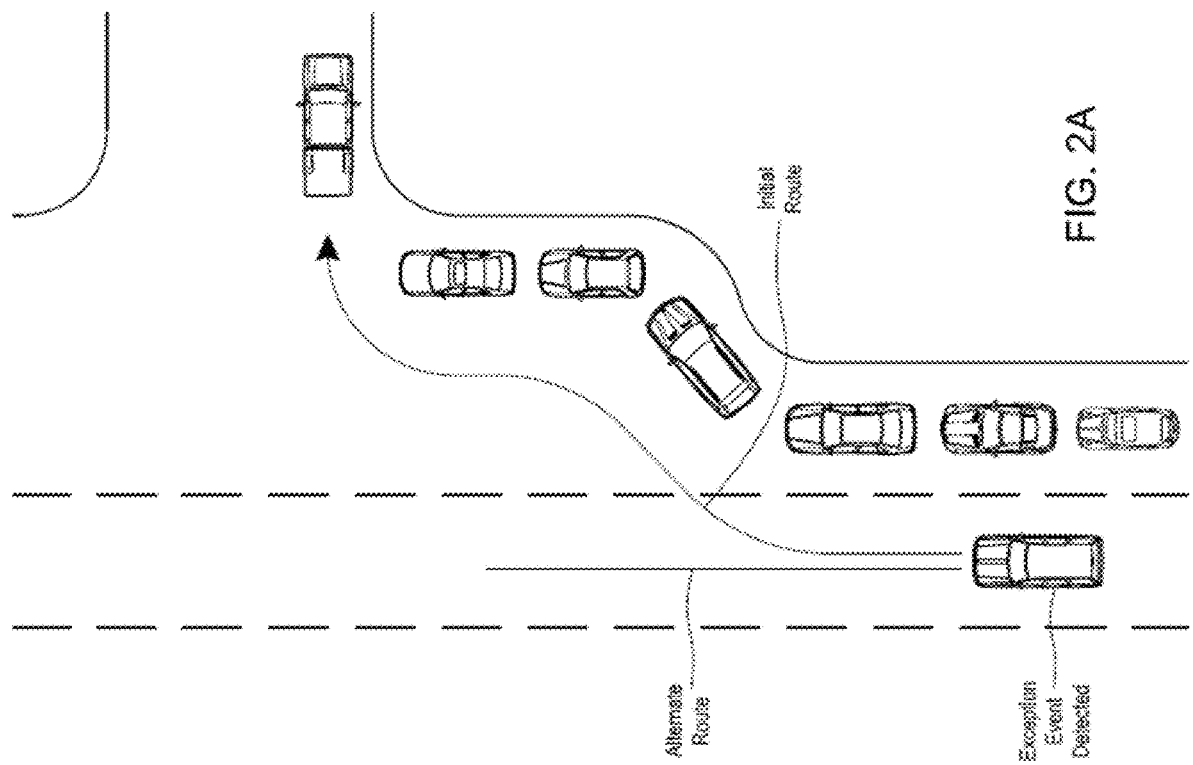
FIG. 2A is an example diagram illustrating an autonomous vehicle encountering an exception event.

FIG. 2A illustrates an example autonomous vehicle detecting an exception event for an upcoming node. In this example, the node is a transition from a first lane to a right turn lane, and the exception event is the right turn lane being blocked with other vehicles. The alternative route is thus accessed and used to navigate the vehicle (to continue going straight past the node).

Figure 2B:
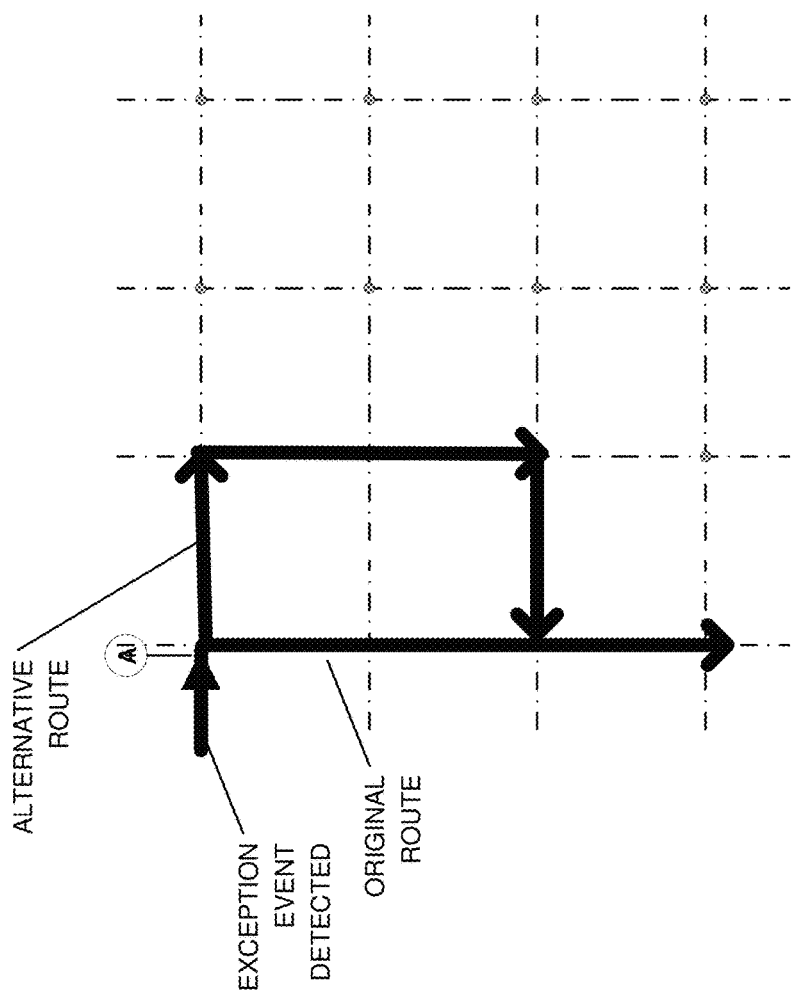
FIG. 2B is an example diagram illustrating an autonomous vehicle utilizing an alternative route in response to encountering an exception event.

FIG. 2B illustrates a schematic map of the original route of FIG. 2A and the execution of an alternative route. As illustrated, prior to reaching node A (navigation to a right turn lane to be followed by right lane), and exception event is detected and so an alternative route is accessed and use to navigate the vehicle. In this example, the alternative route routes the vehicle to merge back with the original route.

Figure 3:
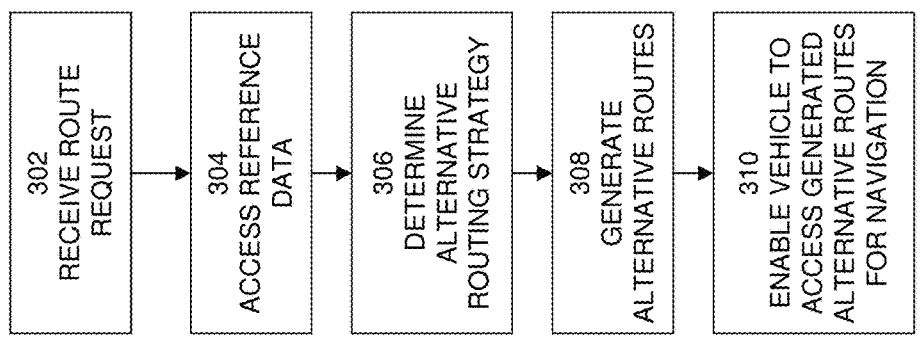
FIG. 3 illustrates an example process for generating exception event alternative routes.

FIG. 3 illustrates an example process for determining when to generate an alternative route. The process may be executed, by example, by a route planning system hosted on a cloud system (e.g., navigation unit 140) or on a vehicle. At block 302, a route request is received. For example, the request from be received over a wired or wireless network from a user via an interface provided by a vehicle navigation system, via an application installed on a user device (e.g., a mobile phone, smart television, set top box, gaming console, etc.), or via a web page accessed via a browser.

At block 304, the process accesses reference data to be used in determining whether alternative routes are to be pre-calculated. The reference data may be accessed from the vehicle (e.g., available memory for storing routes, charge/fuel level, etc.), a local data store, and/or one or more third party data sources. For example, data may be accessed from third party sources via a corresponding Application Data Interface (API). As similarly discussed above, the reference data may include map data.

The map data may include data that may be useful in determining whether alternative routing for a given node should be pre-generated, and in generating routes (including alternative routes). As similarly discussed above, the map data may include the layout of streets and intersections, turning radiuses and/or angles of left and right turns, the distance and dimensions of road features (e.g., road length, road width, intersection dimensions, height and width of bridges over roads, the height and width of vehicle entrances and exits (e.g., for parking structures), etc.), the placement of stop signs and traffic lights, the placement of barriers between two-way traffic, road type (highway, service road, one-way street, two-way street, etc.), and/or the like. By way of further example, the map data may include road markings (e.g., centerline markings dividing lanes of opposing traffic, stop lines, left turn guide lines, right turn guide lines, crosswalks, bus lane markings, bike lane markings, island markings, pavement text, highway exit and entrance markings, etc.), permitted direction of travel, curbs, curb height, and/or other relevant information.

Optionally, the reference data may further include node weights and, in association with corresponding geographical location data, real-time and/or historical traffic information, current and/or predicted weather conditions, road work information, information regarding laws and regulations (e.g., speed limits, whether right turns on red lights are permitted or prohibited, where U-turns are permitted or prohibited, and the like), information regarding events (e.g., concerts, sporting events, festivals, etc.) and/or news events.

At block 306, some or all of the foregoing reference data is used to determine which of a plurality of advance route generation strategies, such as those discussed above with reference to Table 1, is to be selected.

For example, if the route strategy is to be determined using the probability of an exception event occurring on the route as a whole (rather than on a node-by-node basis), the following example formula may be used:

If $\Sigma P<T_1$ then generate alternative route per strategy $S_1$
Where:
P is the probability of an exception event occurring at a given node,
$T_1$=Threshold 1,
$S_1$=Strategy 1 from Table 1.
If $T_1 \leq \Sigma P<T_2$ then select $S_2$
Where
$T_2$=Threshold 2,
$S_2$=Strategy 2 from Table 1.
If $T_2 \leq \Sigma P$ OR $V_{mc}$ is True then select $S_3$
Where
$V_{mc}$=Vehicle performing mission critical function (e.g., an ambulance taking an injured person to a hospital, a fire engine responding to a reported fire, a police vehicle responding to a reported crime or accident, etc.),
$S_3$=Strategy 3 from Table 1.

By way of further example, if the route strategy is to be determined using the probability of an exception event occurring on a node-by-node basis, the following example formula may be used:

If $P_n<T_3$ then generate alternative route in advance for the $n_{th}$ node per strategy $S_4$
Where
$P_n$=the probability of an exception event for the $n_{th}$ node,
$T_3$=Threshold 3,
$S_3$=Strategy 3 from Table 1.
[If $T_3$ $P_n$ OR $V_{mc}$ is True then generate alternative route in advance for the $n_{th}$ node per strategy $S_5$
Where
$V_{mc}$=Vehicle performing mission critical function,
$S_5$=Strategy 5 from Table 1.

By way of further example, if the route strategy is to be determined using the weight of a given node on a node-by-node basis, the following example formula may be used:

If $W_n<WT_1$ then then generate alternative route in advance per strategy $S_6$
Where
$W_n$=the weight for an $n_{th}$ node
$WT_1$=Weight Threshold 1
$S_6$=Strategy 6 from Table 1.

If $WT_1 \le W_n$ OR $V_{mc}$ is True then generate alternative route for a given node per strategy $S_7$ Where $V_{mc}$=Vehicle performing mission critical function $S_7$=Strategy 7 from Table 1.

By way of further example, if the route strategy is to be determined using the weight of node-by-node basis, the following example formula may be used:

If $n_1 P_n + n_2 w_n < T_{PW}$ then generate alternative route in advance for node per strategy $S_8$ Where:

$n_1$=normalization factor 1

$P_n$=probability of exception event for an $n_{th}$ node $n_2$=normalization factor 2

$w_n$=weight assigned to an $n_{th}$ node

If $T_{PW} \le n_1 P_n + n_2 w_n$ OR $V_{mc}$ is True then generate alternative route in advance for node per strategy $S_9$ $V_{mc}$=Vehicle performing mission critical function $S_9$=Strategy 9 from Table 1.

Other factors may be taken into account into selecting a strategy. For example, a strategy may be excluded if the likely amount of resulting data exceeds that amount of memory available for the storage of such resulting data.

At block 308, alternative routes are generated in advance of corresponding exception event in accordance with the selected route advance generation strategy. The given alternative routes may be packaged with identifying data that enables the alternative routes to be easily located and accessed in the event of a corresponding exception event. For example, a given alternative route may optionally be stored in association with a unique alternative route identifier (which may be in the form of a link to the alternative route or may be in the form of an alphanumeric code), a unique identifier associated with the original route, a unique identifier associated with the vehicle, and/or a unique identifier associated with the initial node of the alternative route (e.g., the initial node coordinates).

At block 310, the process enables the vehicle control system (e.g., via control system 126) to access the alternative routes. For example, the alternative routes may be stored in local memory accessible to the vehicle control system. If the alternative routes are generated by a system remote from the vehicle control system (e.g., by the cloud-based system discussed above), the remote system may wirelessly download the alternative routes to the vehicle memory. Optionally, the downloads of the alternative routes may be sequenced in time order of the corresponding nodes of the initial route to better ensure that an alternative route has been downloaded before a corresponding node has been reached. Optionally, once the vehicle control system has detected that is has successfully navigated a node without an exception event occurring, the vehicle control system may purge its memory of data for the alternative routes associated with the successfully navigated node as such alternate route data will not be utilized. This frees up memory for the storage of other data, such as alternate route data for nodes that have not yet been reached.

Figure 4:
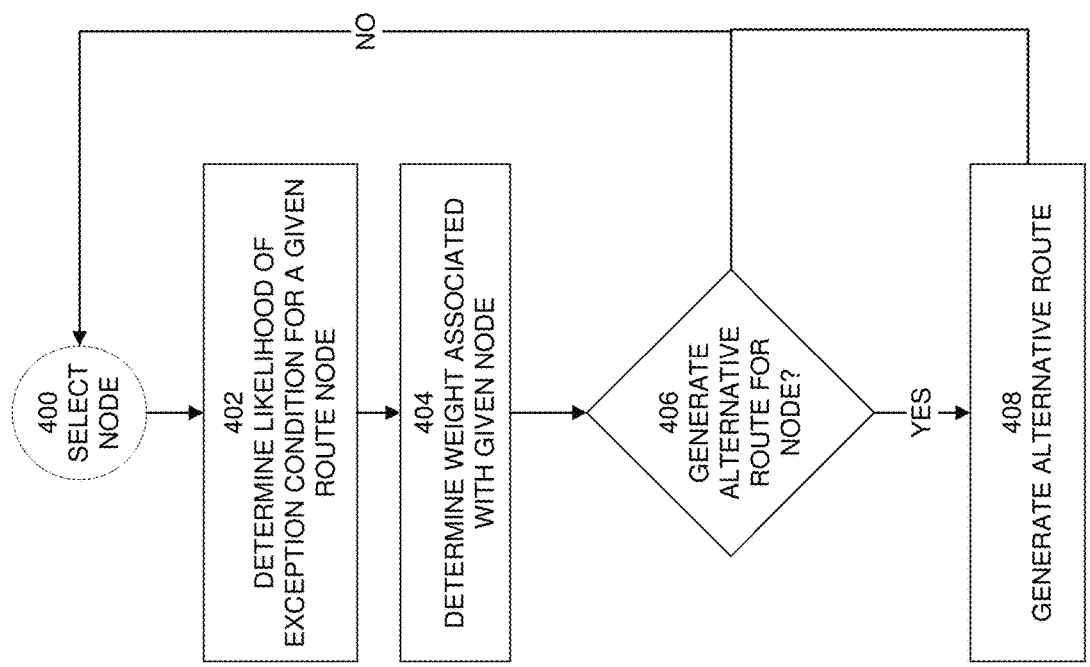
FIG. 4 illustrates an example process for determining when an alternative route is to be pre-generated.

FIG. 4 illustrates an example process for determining whether to generate an alternative route in accordance with strategy 8 in Table 1 above, wherein the process determines whether alternative route is to be generated for a given node of an initial route using an associated weight and probability of exception event.

At block 400, a node is selected from an initial route, where the route is scheduled for a certain time (e.g., immediately or at a scheduled time). At block 402, a determination is made as to the likelihood (e.g., probability) of an exception event occurring with respect to the selected node, as similarly discussed above.

At block 404, a determination is made as to what is the weight associated with the node. As noted above, the weight may reflect the importance of having an alternative route immediately available. For example, a corresponding weight may have been assigned to each potential node in a given area, independent of a particular planned route. By way of further example, optionally a corresponding weight may have been assigned to a given node type. By way of illustration, different weights may be assigned to a lane change, a right turn with no traffic control device, a right turn with a stop light, a right turn with a right turn light, a right turn with a dedicated right turn lane, a left turn with no traffic control device, a left turn with a stop light, a left turn with a left turn light, a left turn with a dedicated left turn lane, a U-turn, a parking operation, a right turn into a driveway, a left turn into a driveway, an on-ramp, an off ramp, and the like.

At block 406, a determination is made as to whether an alternative route is to be generated in advance. As similarly discussed above, the determination may be made using the node weight and the probability of an exception event occurring at the node.

For example, the following evaluation may be performed:

If $n_1 P_n + n_2 w_n > T_{PW}$ then generate in advance alternative route, otherwise do not generate alternative route in advance:

Where:

$n_1$=normalization factor 1

$P_n$=probability of exception event for an $n_{th}$ node $n_2$=normalization factor 2

$w_n$=weight assigned to an $n_{th}$ node

If a determination is made at block 406 not to generate an alternative route, then the process proceeds to the next node (if there is a next node), and the process repeats. If a determination is made at block 406 to generate an alternative route, then the process proceeds to block 408, and an alternative route beginning at node n is generated. The alternative route may be provided to the vehicle control system as similarly discussed above with respect to FIG. 3. The process may then proceed to the next route node (if there is a next node), and the process repeats. If there are no further route nodes, the process may terminate.

Figure 5:
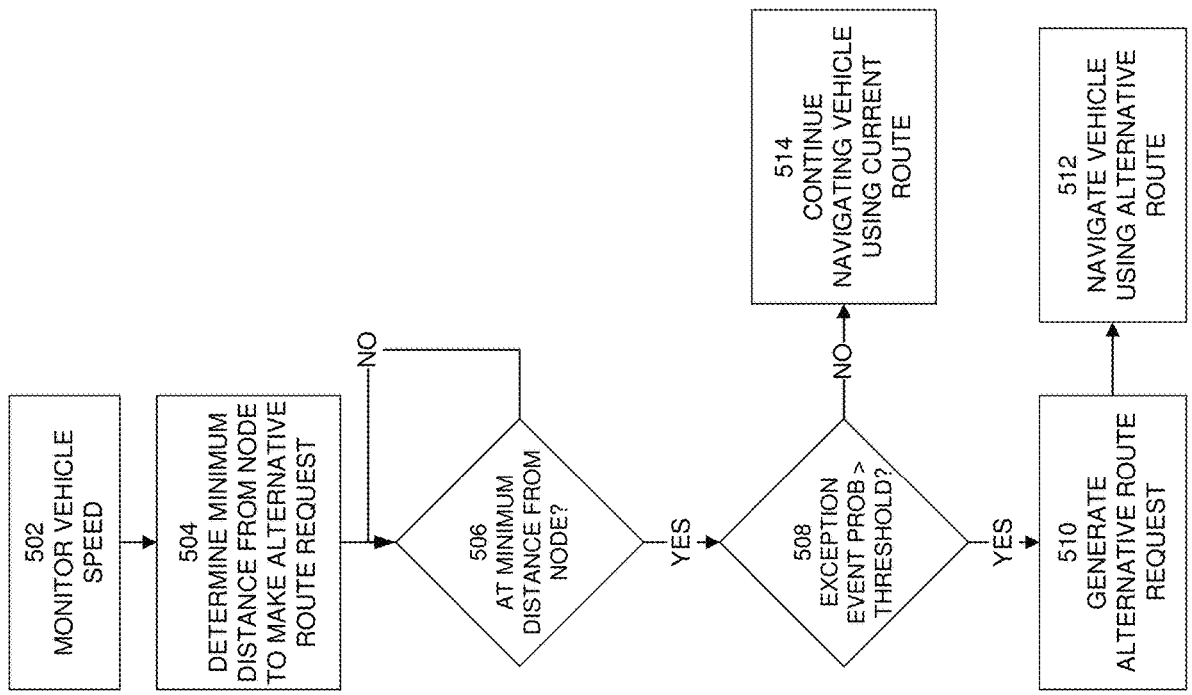
FIG. 5 illustrates an example real-time process for determining when a request for an alternative route is to be generated.
Figure 6:
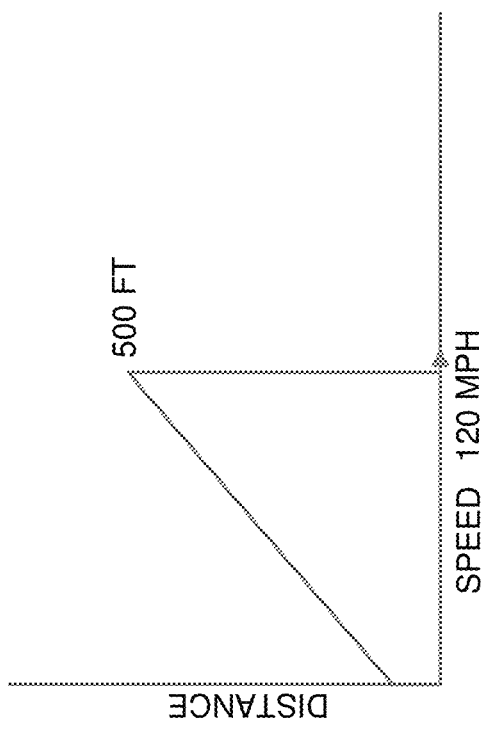
FIG. 6 illustrates an example graph that may be utilized in determining when a request for an alternative route is to be generated.

The on-demand alternative route generation scenario, in which an exception event has been detected but no alternative routes have been generated in advance, will now be described with respect to the process illustrated FIG. 5. At block 502, the current speed of an autonomous vehicle is determined. For example, the speed may be accessed from the vehicle via the OBD II or other protocol, via a satellite-radio navigation system, or otherwise.

At block 504, a determination is made as to what is the minimum safe distance from an upcoming node that would permit a safe transition from the current route to an alternative route (which may require a turn or lane transition) in the event of an exception event. The determination may be made using the current speed of the vehicle, where the higher the speed the greater the minimum safe distance. For example, a table or graph may be accessed, such as the graph illustrated in FIG. 6, that maps a given vehicle speed to a corresponding safe distance. The graph may be different for different vehicles. For example, for a given speed, the minimum safe distance may be shorter for a small sports car with high performing brakes and high stability, than for a large delivery van that may have worse performing brakes and relatively less stability.

At block 506, a determination is made as to whether the vehicle has reached the minimum safe distance from the upcoming node. If the vehicle has reached the minimum safe distance from the upcoming node, at block 508, the process determines the likelihood (e.g., probability) of the existence of an exception event and if the determined likelihood (e.g., probability) exceeds a corresponding threshold. The determination may be made using data from one or more local vehicle sensors and/or data from sensors whose information is wirelessly accessed by the vehicle via a wireless network (e.g., road sensors or sensors of other vehicles in the area of the upcoming node). For example, a determination may be made that a node is blocked using a vehicle LiDAR sensor, a radar, a camera, an inter-vehicle communication system, a road sensor communication system, or the like. The likelihood threshold may be a globally used threshold (used for all route nodes), a threshold specific to the node, or a threshold specific to the node type. The vehicle may also determine that it cannot determine whether or not there is an exception event or the likelihood of an exception event.

If the likelihood does not exceed the corresponding threshold, at block 514, the vehicle continues using the current route for navigation.

If the likelihood exceeds the corresponding threshold, then at block 510, the vehicle may determine if there is already an alternative route available, and if not, the vehicle generates an alternative route request. The request may be provided to a local, vehicle-based route planning system or may be wirelessly transmitted to a remote route planning system. At block 512, the alternative route is received and used to navigate the vehicle.

Autonomous Vehicle Telemetry

As discussed above, in order to improve the safe and efficient operation of autonomous vehicles, it is useful to be able to collect and analyze telemetry data from large numbers of autonomous vehicles while they are in operation. Such data may be used for diagnostic purposes, such as to identify and rectify errors or faults. In addition, such data may be used to improve the routing of autonomous vehicles using an improved simulation of the environment in which vehicles will be navigated. Further, such data may be used to simulate vehicle performance. While in certain circumstances it may be desirable to have vehicles continuously transmit telemetry data, in many situations such continuous transmission may unduly burden wireless networks as well as the network, processing, and memory resources of a remote telemetry analysis system. Thus, it would be advantageous to be able to selectively control the transmission of telemetry data logged by the vehicle control system to insure certain desirable telemetry is timely transmitted for analysis and use, while other telemetry data is transmitted with less frequency or not at all.

The logged telemetry data may include time-stamped position information (e.g., location latitude and longitude coordinates or other location data as determined via the vehicle's satellite-radio navigation system, Wi-Fi or cell triangulation system, or otherwise), vehicle pose (position and orientation) information, speed information, acceleration information, deceleration information, turn information, detected object information (e.g., information from a LiDAR sensor, a radar, a camera, an inter-vehicle communication system, a road sensor communication system, or the like), pavement marking information (e.g., crosswalks, lane dividers, island markers, etc.), text data (e.g., read from street signs, pavement, store signs, etc.), route data, perception data, exception data, weather data, road condition data, road feature dimension data, and/or other information. The detected object information may include the detection and identification of objects, such as other vehicles, construction equipment, bollards, street barricades, buildings, and the like.

Figure 1C:
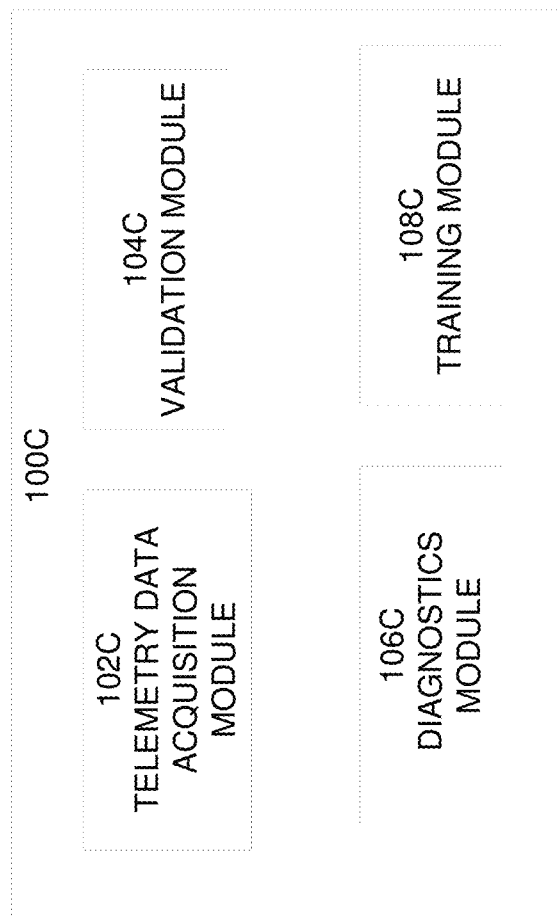
FIG. 1C illustrates a block diagram of an example processing system.

Referring to FIG. 1C, an example processing system 100C is disclosed The processing system may be included in the server 130 illustrated in FIG. 1A or may be a separate system. The example processing system includes a telemetry data acquisition module 102C, a validation module 104C, diagnostics module 106C, and a training module 108C.

The telemetry data acquisition module 102C may receive, store, preprocess, and/or identify telemetry data of interest from a vehicle (e.g., from vehicle control system 128 via communication system 124 of vehicle 120), such as the data described above. For example, the telemetry data acquisition module 102C may store received telemetry data in a telemetry database, and may normalize telemetry data prior to the telemetry being utilized for validation or training. For example, the process may normalize the road length, which may range from 0 to 3500 miles, to obtain normalized road length ranging from 0 to 1. The telemetry data acquisition module 102C may also identify telemetry data of interest and inhibit processing of other telemetry data to reduce computer resource utilization and to enhance the speed of processing and analysis.

The telemetry data from the telemetry data acquisition module 102C may be provided to the training module 108C in order to train a route recommendation model used by the navigation unit 140, in conjunction with other data. The route recommendation model may be used to generate a route (e.g., by navigation unit 140) in according with a route request. The route may include location data, turn-by-turn instruction data, acceleration instruction data, stop instruction data, deceleration instruction data, predicted vehicle arrival times at various points on the route (e.g., at each node, periodically based on time or distance travelled, at the final destination, at each waypoint, or the like,), etc.

In addition to the telemetry data from the vehicle, data from other sources, such as map data, current and/or historical traffic data, current and/or historical weather data, current and/or historical traffic data, and/or other reference data discussed herein may be used by the training module 108D to train the route recommendation model.

The training of the route recommendation model may be performed using an iterative training process, where the training process is terminated after a certain number of iterations or when certain criteria are met. During the training process, one or more of the route recommendation model parameters may be updated to optimize the model.

The telemetry data may also be used by the validation module 104C to validate the accuracy of predictions generated based on the route commendation model. For example, the validation module 104C may verify the accuracy of the generated route by comparing the actual route that the vehicle navigated as compared to the initial route generated using the route commendation model. In addition, the validation module 104C may compare the predicted arrival time at various points along the route with the actual arrival time at those same points as determined from the telemetry data. Optionally, if the accuracy is less than a first threshold, then the route recommendation model may be designated for further training. The validation module 104C may also be used to validate reference data (including map data).

The diagnostics module 106C may use the telemetry data for diagnostic purposes, such as to detect errors or deficiencies in a vehicle's sensors or navigation system. For example, as discussed elsewhere herein, if vehicle telemetry data indicates that the vehicle sensors did not detect a first object (e.g., a street sign or traffic light) at a position where the map indicates the first object is present, a determination may be made that either the vehicle suffered a fault (e.g., either in a sensor or in the processing of sensor signals), or there may be a map error (e.g., the first object may never have been present or the first object may have been removed).

The diagnostics module 106C may utilize data from other sources (e.g., for sensor data from other vehicles) to determine whether the vehicle is at fault or whether the map is at fault. For example, if one or more other vehicles fail to detect the first object, a determination may be made that the vehicle sensor is performing properly, but that the map is in error. If a determination is made that the map is in error, the map may be updated. If instead one or more other vehicles detects the first object, a determination may be made that the vehicle that failed to detect the object is in error and a determination may be made that the vehicle needs to be service and repaired, or a software update needs to be download to correct the error.

Figure 7:
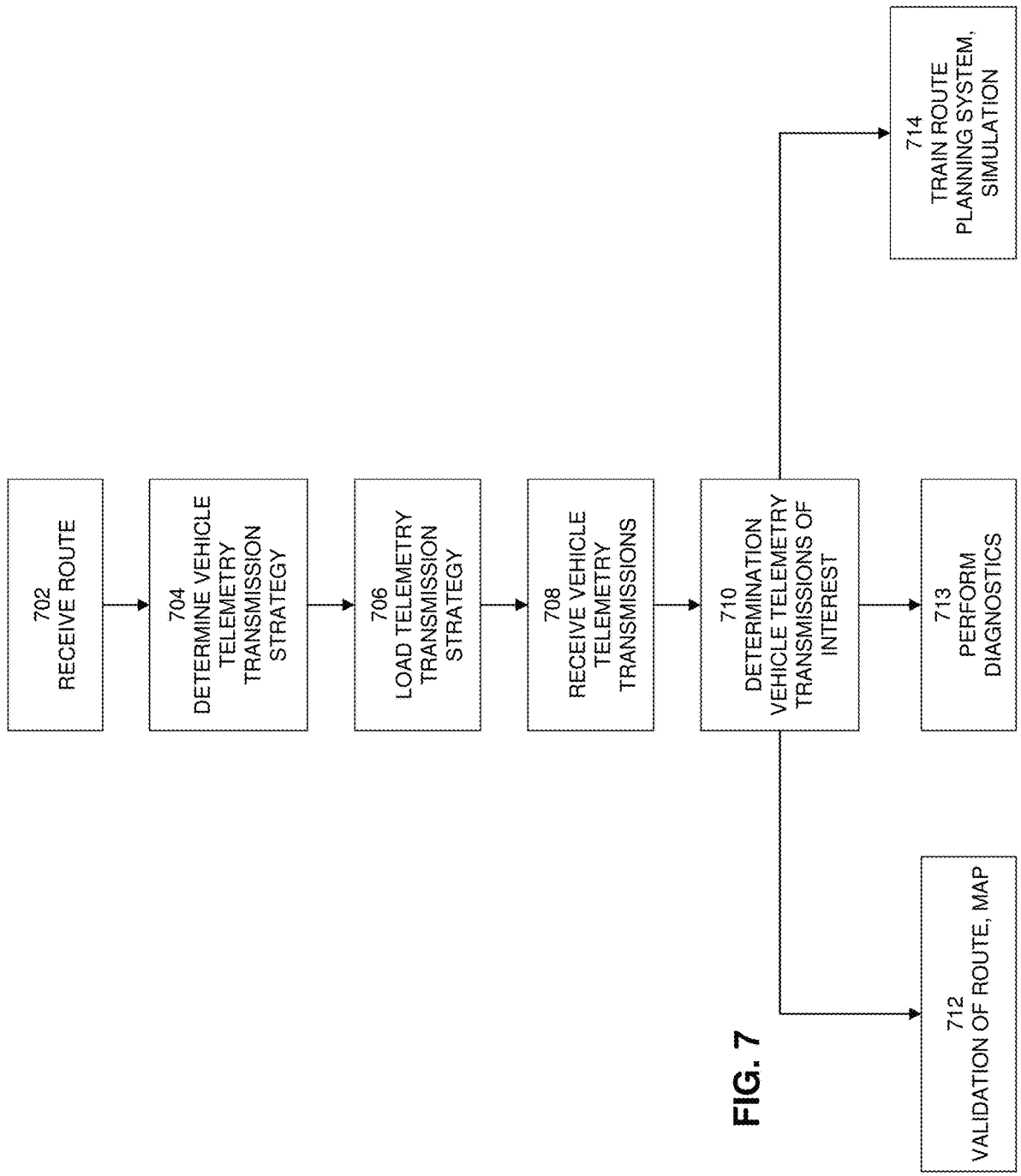
FIG. 7 illustrates an example process for the transmission and utilization of autonomous vehicle position and sensor data.

Referring now to FIG. 7, an example process for the transmission and utilization of autonomous vehicle position and sensor data will be described.

At block 702, the telemetry analysis system receives route data for a planned vehicle route. The route data may include a route starting position, the final destination, waypoints, and each navigation maneuver. The telemetry analysis system may be a cloud-based system. At block 704, a determination is made as to a telemetry transmission strategy including one or more broadcast parameters used to control the broadcast of telemetry data. A variety of factors may be taken into account in determining the telemetry transmission strategy, including some or all of the following:

length of route,
age of available navigation data for route segments,
age of available navigation data for route segments under current weather conditions,
scheduled construction along route,
availability of communication bandwidth for transmission of telemetry data, and/or
availability of storage for transmission of telemetry data.

For example, the route may be divided into segments. The segments may be defined such that some or all of the segments are the same length. Optionally instead, the route may be divided into segments such that each segment is bracketed by a node. Other strategies may be used to define segments. If there is little recent data for one or more route segments, it may be desirable to obtain more recent data for future route planning purposes to ensure that the route planning uses map data that accurately reflects the actual road conditions. Similarly, if there is little recent data for one or more route segments under the current weather condition, it may be desirable to obtain more recent data regarding traffic patterns along the route in such whether. By way of yet further example, if construction is taking place along the route, it may be desirable to obtain data regarding whether the construction has resulted in blocked nodes or has changed traffic patterns. By way of still further example, if there is only intermittent of availability of wireless network bandwidth, it may be desirable to limit telemetry transmissions.

In addition or instead, the telemetry strategy may include having telemetry data associated with each navigation node and/or each exception event be transmitted by the vehicle.

Thus, for example, the telemetry transmission schedule for the logged data could be continuous, periodic (e.g., every 5 seconds, 30 seconds, minute, 5 minutes, 15 minutes, or other time frame), or in batch mode after the vehicle has reached its final destination. By way of further example, the telemetry transmission schedule may specify continuous transmission for certain segments (e.g., where there is a lack of recent data or where there is dynamically changing road construction), and periodic or no transmission for other route segments. By way of yet further example, a first telemetry transmission schedule may be specified for certain types of telemetry data (e.g., continuous for vehicle position information or for diversions from the original route), a second telemetry transmission schedule may be specified for certain other types of telemetry data (e.g., object detection), and a third telemetry transmission schedule may be specified for still other types of telemetry data (e.g., pavement text, pavement markings, street sign text, etc.). Optionally, the telemetry transmission schedule may specify that the transmission of telemetry data is to be halted if the vehicle is parked and/or stationary for more than a threshold period of time. Advantageously, the foregoing techniques reduce the possibility that desirable telemetry data will be overwritten in memory prior to the desirable telemetry data being broadcast.

At block 706, the transmission schedule is transmitted and loaded to the vehicle telemetry system. At block 708, the vehicle telemetry system wirelessly transmits the telemetry data according to the corresponding telemetry schedule and the data is received and stored by the telemetry analysis system. A given telemetry transmission may include data that enables the telemetry analysis system to quickly identify data of interest. The telemetry analysis system may optionally not analyze certain telemetry data is not of interest, and may optionally purge such data from memory, thereby freeing up such memory to store other data.

For example, a given telemetry transmission may include header indicating what data will be included in the transmission, the amount of data, and/or the number of packets in the transmission. In addition, the telemetry transmission may include one or more time stamps. For example, there may be a time stamp as to when the transmission occurred and/or when a given item of data was captured. Optionally, a given item of telemetry data is transmitted in association with vehicle pose (position and orientation) data to aid the telemetry analysis system in synchronizing the telemetry with a specific location.

At block 710, the telemetry analysis system identifies particular telemetry data of interest. For example, the telemetry data of interest may be identified by vehicle position data, vehicle orientation data, time stamp data, and/or the like.

At block 712, the telemetry data of interest may be used to validate the route, to validate the map used to generate the map, and/or for vehicle diagnostics (e.g., to detect errors with respect to the vehicles operations and/or sensors). For example, if the vehicle sensors have detected a traffic signal, traffic sign, or road barrier at a corresponding location that does not appear on the map, the map may be updated with the detected item, the detected item may be verified by a service person or using telemetry data from other vehicles prior to updating the map, or other action may be taken.

At block 713, the telemetry data of interest may be used for vehicle diagnostics (e.g., to detect errors with respect to the vehicles operations and/or sensors). For example, if the telemetry indicated that the vehicle failed to detect an item that is present (e.g., an object or a curve in the road) or misidentified an item (e.g., identified a stop sign as a no parking sign), this may indicate an error in a vehicle sensor or associated processing software or associated hardware (e.g., a processing component, a power supply, an analog-to-digital converter, a communication interface, etc.). Such information may be logged and the vehicle may be called in for repair, new software may be downloaded to the vehicle to correct the error, and/or the detected error may be used to improve future versions of vehicles to avoid such errors. If similar failures are dedicated in the sensors of other vehicles, a determination may be made that there is a widespread manufacturing or design flaw, and a recall of vehicles having sensors corresponding to those that have been determined to have failed may be performed.

At block 714, the telemetry data may be used to train the route planning system. For example, the route planning system may include a learning engine. The telemetry data may be used to create a simulation of a navigation environment and to generate test cases. For example, objects detected by the vehicle may be added to a simulated route. Further, the telemetry data may be used to simulate vehicle performance. By way of illustration, if it is determined from the telemetry data that the vehicle LiDAR failed to detect an object in a certain fog condition, future simulations of the vehicle may likewise reflect the inability of a vehicle LiDAR to detect objects in such a fog condition.

The process may optionally perform a preprocessing operation (e.g., normalizing, and/or wiping off error points) on the telemetry data prior to the telemetry being utilized for validation or training. For example, the process may normalize the road length, which may range from 0 to 3000 miles, to obtain normalized road length ranging from 0 to 1.

In addition, the telemetry data may be used in generating updated routes in real time in the event the route planning system determines that the vehicle should be rerouted based on data received from another source indicated unexpected congestion or an accident on the current route. The route planning system may determine the given vehicle's current position using position information included in the telemetry data and generate an updated route from the vehicle's current position to avoid the congestion or accident. The route planning system may then transmit the updated route to the vehicle control system for execution.

Example Embodiments

Some example enumerated embodiments of the present invention are recited in this section in the form of methods, systems, and non-transitory computer-readable media, without limitation.

An aspect of the disclosure relates to a computer implemented method of generating routes for an autonomous vehicle, the method comprising: receiving at a first route planning system a request for a first navigation route for a remote autonomous vehicle, the request comprising an origination location and a destination location and associated with a navigation start time; generating by the first route planning system the first navigation route based at least in part on the origination location, the destination location, and the start time, the first navigation route comprising a plurality of nodes, wherein a given node corresponds to a navigation event; for a given node in the first navigation route, identifying by the first route planning system a corresponding weight, and/or for a given node in the first navigation route determining by the first route planning system a probability of an exception event occurring at the given node; using, by the first route planning system, the weight corresponding to the given node and/or the determined probability of an exception event occurring at the given node to determine whether to generate a corresponding alternate route that excludes the given node, the corresponding alternate route configured to be utilized in response to a future detection by the autonomous vehicle of an exception event associated with the given node, wherein the exception event inhibits the autonomous vehicle from navigating the given node; in response to determining that the corresponding alternate route is to be generated, generating by the first route planning system the alternate route; and transmitting the first navigation route and the corresponding alternate route to the autonomous vehicle and enabling the autonomous vehicle to use the first navigation route to navigate the autonomous vehicle, and enabling the corresponding alternate route to be used to navigate the autonomous vehicle if an exception event associated with the given node is detected.

An aspect of the disclosure relates to navigation route planning system, comprising: a computing device; a network interface; non-transitory computer readable memory having program instructions stored thereon that when executed by the computing device cause the computing device to: receive, using the network interface, a request for a first navigation route for a remote vehicle, the request comprising an origination location and a destination location and associated with a navigation start time; generate the first navigation route using the origination location, the destination location, and the start time, the first navigation route comprising one or more nodes, wherein a given node corresponds to a navigation event; for a given node in the first navigation route, identify a corresponding weight, and/or for a given node in the first navigation route determine a likelihood or probability of an exception event occurring at the given node; use the weight corresponding to the given node and/or the determined likelihood or probability of an exception event occurring at the given node to determine whether to generate a corresponding alternate route that excludes the given node, the corresponding alternate route configured to be utilized in response to a future detection by the vehicle of an exception event associated with the given node, wherein the exception event inhibits the vehicle from navigating the given node; in response to determining that the corresponding alternate route is to be generated, generate the alternate route; and transmit the first navigation route and the corresponding alternate route to the vehicle and enable the vehicle to use the first navigation route to navigate the vehicle, and enable the corresponding alternate route to be used to navigate the vehicle when an exception event associated with the given node is detected.

An aspect of the disclosure relates to non-transitory computer readable memory having program instructions stored thereon that when executed by a computer system device cause the computer system to performing operations comprising: receive a request for a first navigation route for a remote vehicle, the request comprising an origination location and a destination location and associated with a navigation start time; generate the first navigation route using the origination location, the destination location, and the start time, the first navigation route comprising one or more nodes, wherein a given node corresponds to a navigation event; for a given node in the first navigation route, identify a corresponding weight, and/or for a given node in the first navigation route determine a likelihood or probability of an exception event occurring at the given node; use the weight corresponding to the given node and/or the determined likelihood or probability of an exception event occurring at the given node to determine whether to generate a corresponding alternate route, the corresponding alternate route configured to be utilized in response to a future detection by the vehicle of an exception event associated with the given node; in response to determining that the corresponding alternate route is to be generated, generate the alternate route; and cause the first navigation route and the corresponding alternate route to be transmitted to the vehicle, wherein the vehicle is to use the first navigation route to at least initially navigate the vehicle, and wherein the vehicle is to use the corresponding alternate route to navigate the vehicle when an exception event associated with the given node is detected.

An aspect of the disclosure relates to a computer implemented method of controlling the broadcast of telemetry data from an autonomous vehicle, the method executed by a system comprising one or more processing devices, the method comprising: accessing routing data for a first route generated by a route planning system for an autonomous vehicle, the routing data configured to control navigation of the autonomous vehicle; using the routing data for the first route, generating one or more telemetry broadcast controls to be used by the autonomous vehicle in broadcasting telemetry data, including at least vehicle position data, while the autonomous vehicle is being navigated using the routing data, wherein the telemetry broadcast controls are configured to cause the autonomous vehicle to broadcast telemetry data for selected segments of the first route and to inhibit the broadcast of telemetry data for non-selected segments of the first route; transmitting the telemetry broadcast controls to the autonomous vehicle; receiving, from the autonomous vehicle, transmissions of telemetry data for the selected segments of the first route; using at least the received telemetry data in generating a simulated environment for a route planning learning engine; and using at least a portion of the received telemetry data to perform diagnostics on the autonomous vehicle and/or to validate map data used to generate the first route.

An aspect of the disclosure relates to a system, comprising: a computing device; a network interface; non-transitory computer readable memory having program instructions stored thereon that when executed by the computing device cause the computing device to: access routing data for a first route for a vehicle, the routing data configured to be used to navigate the vehicle; generate telemetry broadcast parameters to be used by the vehicle in broadcasting telemetry data, the telemetry data including at least vehicle position data, while the vehicle is being navigated using the routing data, wherein the telemetry broadcast parameters are configured to cause the vehicle to broadcast telemetry data for portions of the first route in accordance with the broadcast parameters; transmit, via the network interface, the telemetry broadcast parameters to the vehicle; receive, from the vehicle, transmissions of telemetry data for the selected portions of the first route; and use at least the received telemetry data in generating a simulated environment for a route planning learning engine.

An aspect of the disclosure relates to a non-transitory computer readable memory having program instructions stored thereon that when executed by a computer system device cause the computer system to performing operations comprising: access routing data for a first route for a vehicle, the routing data configured to be used to navigate the vehicle; generate telemetry broadcast parameters to be used by the vehicle in broadcasting telemetry data, the telemetry data including at least vehicle position data, while the vehicle is being navigated using the routing data, wherein the telemetry broadcast parameters are configured to cause the vehicle to broadcast telemetry data for portions of the first route in accordance with the broadcast parameters; transmit, via the network interface, the telemetry broadcast parameters to the vehicle; receive, from the vehicle, transmissions of telemetry data for the selected portions of the first route; and use at least the received telemetry data in generating a simulated environment for a route planning learning engine.

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Thus, the present disclosure discloses systems and methods for dynamically adapting routing to accommodate a dynamically changing environment, thereby ensuring the safe and efficient operations of autonomous vehicles.

In addition, the present disclosure discloses systems and methods for utilizing autonomous vehicle telemetry data to detect vehicle component and software failures and errors.

Still further, the present disclosure discloses systems and methods for utilizing autonomous vehicle telemetry data to simulate vehicle performance and to simulate a vehicle navigation environment to thereby improve route planning.

While the present disclosure is generally described herein with respect to autonomous vehicles, this is merely for illustrative purposes and is not meant to be limiting. Any of the techniques or operations described herein can apply to vehicles that provide driver assist-features and/or that are used for ride-sharing or other location-based services.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer implemented method of controlling the broadcast of telemetry data from an autonomous vehicle, the method executed by a system comprising one or more processing devices, the method comprising:
   accessing, from computer readable memory, routing data for a first route generated by a route planning system for an autonomous vehicle, the routing data configured to control navigation of the autonomous vehicle;
   using the routing data for the first route and the determination of at what route segments or traversal notes existing telemetry data is insufficient, wherein there is a lack of recent data or where there is dynamically changing road construction, and independent of sensor data from the autonomous vehicle while traversing the route, generating one or more telemetry broadcast controls for the control of transmission telemetry data by the autonomous vehicle to be transmitted to and used by the autonomous vehicle in broadcasting telemetry data, including at least vehicle position data, while the autonomous vehicle is being navigated using the routing data on the route having insufficient data,
   wherein the telemetry broadcast controls for the control of transmission telemetry data by the autonomous vehicle are configured to:
      cause the autonomous vehicle to broadcast telemetry data for selected segments of the first route and to inhibit the broadcast of telemetry data for non-selected segments of the first route, to thereby reduce how much telemetry data is transmitted by the autonomous vehicle and to insure desirable telemetry is timely transmitted for analysis and use, while other telemetry data is not transmitted, and
      provide a telemetry data broadcast schedule, comprising a first telemetry data broadcast schedule for a first type of vehicle telemetry data, the first telemetry data broadcast schedule specifying a first broadcast period for the first type of vehicle telemetry data, and a second telemetry data broadcast schedule for a second type of vehicle telemetry data, the second telemetry data broadcast schedule specifying a second broadcast period for the second type of vehicle telemetry data;
   transmitting, using a network interface, the telemetry broadcast controls to the autonomous vehicle, the telemetry broadcast controls configured to cause the autonomous vehicle to broadcast telemetry data for selected segments of the first route and to inhibit the broadcast of telemetry data for non-selected segments of the first route and to provide a telemetry data broadcast schedule;
   receiving, using the network interface and a telemetry acquisition module, from the autonomous vehicle, transmissions of telemetry data for the selected segments of the first route in accordance with telemetry broadcast controls and the first telemetry data broadcast schedule for the first type of vehicle telemetry data, and the second telemetry data broadcast schedule for the second type of vehicle telemetry data, wherein telemetry data is inhibited from being broadcast for non-selected segments of the first route;
   using at least the received telemetry data, received in accordance with the telemetry broadcast controls and the first telemetry data broadcast schedule for the first type of vehicle telemetry data, and the second telemetry data broadcast schedule for the second type of vehicle telemetry data, in generating a simulated environment for a route planning learning engine;
   examining telemetry data from the autonomous vehicle and determining if the autonomous vehicle misidentified a first item;
   at least partly in response to determining, from the examined telemetry data, that the autonomous vehicle misidentified a first item, taking a remedial action with respect to the autonomous vehicle;
   using, by a validation module, at least a portion of the received telemetry data, received in accordance with the telemetry broadcast controls, to validate map data used to generate the first route; and
   using the validated map data to control at least one autonomous vehicle to navigate at least a portion of at least one route.

2. The computer implemented method as defined in claim 1, the method further comprising using at least a portion of the received telemetry data to simulate a vehicle.

3. The computer implemented method as defined in claim 1, wherein the telemetry broadcast controls are configured to cause the autonomous vehicle to transmit telemetry data at node traversals.

4. The computer implemented method as defined in claim 1, wherein the telemetry broadcast controls are configured to cause the autonomous vehicle to transmit telemetry data at specified traversed distance intervals.

5. The computer implemented method as defined in claim 1, wherein the telemetry broadcast controls are configured to cause the autonomous vehicle to transmit telemetry data at specified time intervals.

6. The computer implemented method as defined in claim 1, wherein a first segment of the first route for which telemetry data is to be broadcast is selected based on how recent map data, stored in a first data store, is for the first segment.

7. The computer implemented method as defined in claim 1, wherein a first segment of the first route for which telemetry data is to be broadcast is selected based on a determination that road construction is present on the first segment.

8. The computer implemented method as defined in claim 1, wherein using at least a portion of the received telemetry data to perform diagnostics on the autonomous vehicle further comprises:
   determining a presence of a first object at a first location on a digital of map of a first segment of the first route;

determining whether the received telemetry data includes sensor data indicating a presence of the first object at the first location; and at least partly in response to determining that the sensor data does not indicate a presence of the first object at the first location, initiate remediation action with respect to the autonomous vehicle.

9. The computer implemented method as defined in claim 1, wherein using at least a portion of the received telemetry data to perform diagnostics on the autonomous vehicle further comprises:

determining a presence of a first object at a first location on a digital map of a first segment of the first route;

determining whether the received telemetry data includes sensor data indicating a presence of the first object at the first location; and at least partly in response to determining that the sensor data does not indicate a presence of the first object at the first location, access telemetry data of other vehicles that have traversed a route that includes a view of the first location to determine if the telemetry data of the other vehicles includes sensor data indicating a presence of the first object at the first location; and at least partly in response to determining that the telemetry data of the other vehicles does not include sensor data indicating a presence of the first object at the first location, updating the digital map to indicate that first object is not present at the first location.

10. A system, comprising:

a computing device;

a network interface;

non-transitory computer readable memory having program instructions stored thereon that when executed by the computing device cause the computing device to:

access routing data for a first route for a vehicle, the routing data configured to be used to navigate the vehicle;

determine, for the first route, at what route segments or traversal nodes existing telemetry data is insufficient, wherein there is a lack of recent data or where there is dynamically changing road construction, use the routing data for the first route and the determination of at what route segments or traversal notes existing telemetry data is insufficient, and independent of sensor data from the autonomous vehicle while traversing the route, generate telemetry broadcast parameters for the control of transmission telemetry data by the vehicle to be transmitted to and used by the vehicle in broadcasting telemetry data, the telemetry data including at least vehicle position data, the telemetry broadcast parameters including first broadcast instructions for a first type of vehicle telemetry data and second broadcast instructions for a second type of vehicle telemetry data, while the vehicle is being navigated using the routing data, wherein the telemetry broadcast parameters are configured to cause the vehicle to broadcast telemetry data for portions of the first route having insufficient data in accordance with the broadcast parameters;

transmit, via the network interface, the telemetry broadcast parameters to the vehicle, to thereby reduce how much telemetry data is transmitted by the autonomous vehicle;

receive, from the vehicle, transmissions of telemetry data for the selected portions of the first route in accordance with telemetry broadcast parameters, wherein telemetry data is inhibited from being broadcast for non-selected segments of the first route; and use at least the received telemetry data received in accordance with the telemetry broadcast parameters in generating a simulated environment for a route planning learning engine;

use the route planning engine to generate at least one route; and cause at least one vehicle to be navigated on at least a portion of the at least one route;

examine telemetry data from the vehicle and determining if the vehicle failed to detect or misidentified a first item; and at least partly in response to determining, from the examined telemetry data, that the vehicle failed to detect or misidentified a first item, cause a remedial action to be taken with respect to the vehicle.

11. The system as defined in claim 10, wherein the system is configured to use at least a portion of the received telemetry data to use at least a portion of the received telemetry data to simulate a vehicle.

12. The system as defined in claim 10, wherein the system is configured to use at least a portion of the received telemetry data to perform diagnostics on the vehicle and/or to validate map data used to generate the first route.

13. The system as defined in claim 10, wherein the telemetry broadcast parameters are configured to cause the vehicle to transmit telemetry data at node traversals.

14. The system as defined in claim 10, wherein the telemetry broadcast parameters are configured to cause the vehicle to transmit telemetry data at specified traversed distance intervals.

15. The system as defined in claim 10, wherein the telemetry broadcast parameters are configured to cause the vehicle to transmit telemetry data at specified time intervals.

16. The system as defined in claim 10, wherein a first portion of the first route for which telemetry data is to be broadcast is selected based on how recent map data, stored in a first data store, is for the first portion.

17. The system as defined in claim 10, wherein a first portion of the first route for which telemetry data is to be broadcast is selected based on a determination that road construction is present on the first portion.

18. The system as defined in claim 10, wherein the system is configured to use at least a portion of the received telemetry data to:

determine a presence of a first object at a first location on a digital of map of a first segment of the first route;

determine whether the received telemetry data includes sensor data indicating a presence of the first object at the first location; and at least partly in response to a determination that the sensor data does not indicate a presence of the first object at the first location, initiate remediation action with respect to the vehicle.

19. The system as defined in claim 10, wherein the system is configured to use at least a portion of the received telemetry data to:

determine a presence of a first object at a first location on a digital map of a first segment of the first route;

determine whether the received telemetry data includes sensor data indicating a presence of the first object at the first location; and at least partly in response to a determination that the sensor data does not indicate a presence of the first object at the first location, access telemetry data of other vehicles that have traversed a route that includes a view of the first location to determine if the telemetry data of the other vehicles includes sensor data indicating a presence of the first object at the first location; and at least partly in response to a determination that the telemetry data of the other vehicles does not include sensor data indicating a presence of the first object at the first location, update the digital map to indicate that first object is not present at the first location.

20. Non-transitory computer readable memory having program instructions stored thereon that when executed by a computer system device cause the computer system to performing operations comprising:

access routing data for a first route for a vehicle, the routing data configured to be used to navigate the vehicle;

determine, for the first route, at what route segments or traversal nodes existing telemetry data is insufficient, wherein there is a lack of recent data or where there is dynamically changing road construction, use the routing data for the first route and the determination of at what route segments or traversal notes existing telemetry data is insufficient, and independent of sensor data from the vehicle while traversing the route, generate telemetry broadcast parameters for the control of transmission telemetry data by the vehicle to be transmitted to and used by the vehicle in broadcasting telemetry data, the telemetry data including at least vehicle position data, the telemetry broadcast parameters including first broadcast instructions for a first type of vehicle telemetry data and second broadcast instructions for a second type of vehicle telemetry data, while the vehicle is being navigated using the routing data, wherein the telemetry broadcast parameters are configured to cause the vehicle to broadcast telemetry data for portions of the first route having insufficient data in accordance with the broadcast parameters;

transmit, via the network interface, the telemetry broadcast parameters to the vehicle;

receive, from the vehicle, transmissions of telemetry data for the selected portions of the first route in accordance with telemetry broadcast parameters, wherein telemetry data is inhibited from being broadcast for non-selected segments of the first route;

use at least the received telemetry data, received in accordance with the telemetry broadcast parameters, in generating a simulated environment for a route planning learning engine;

use the route planning engine to generate at least one route;

cause at least one vehicle to be navigated on at least a portion of the at least one route;

examine telemetry data from the vehicle and determining if the vehicle failed to detect or misidentified a first item; and at least partly in response to determining, from the examined telemetry data, that the vehicle failed to detect or misidentified a first item, cause a remedial action to be performed with respect to the vehicle.

21. The non-transitory computer readable memory as defined in claim 20, wherein the program instructions when executed by a computer system device are further configured to use the received telemetry data to simulate a vehicle.

22. The non-transitory computer readable memory as defined in claim 20, wherein the program instructions when executed by a computer system device are further configured to cause the computer system to use at least a portion of the received telemetry data to perform diagnostics on the vehicle and/or to validate map data used to generate the first route.

23. The non-transitory computer readable memory as defined in claim 20, wherein the telemetry broadcast parameters are configured to cause the vehicle to transmit telemetry data at node traversals.

24. The non-transitory computer readable memory as defined in claim 20, wherein the telemetry broadcast parameters are configured to cause the vehicle to transmit telemetry data at specified traversed distance intervals.

25. The non-transitory computer readable memory as defined in claim 20, wherein the telemetry broadcast parameters are configured to cause the vehicle to transmit telemetry data at specified time intervals.

26. The non-transitory computer readable memory as defined in claim 20, wherein a first portion of the first route for which telemetry data is to be broadcast is selected based on how recent map data, stored in a first data store, is for the first portion.

27. The non-transitory computer readable memory as defined in claim 20, wherein a first portion of the first route for which telemetry data is to be broadcast is selected based on a determination that road construction is present on the first portion.

28. The non-transitory computer readable memory as defined in claim 20, wherein the program instructions when executed by a computer system device are further configured to cause the computer system to use at least a portion of the received telemetry data to:

determine a presence of a first object at a first location on a digital of map of a first segment of the first route;

determine whether the received telemetry data includes sensor data indicating a presence of the first object at the first location; and at least partly in response to a determination that the sensor data does not indicate a presence of the first object at the first location, initiate remediation action with respect to the vehicle.

29. The non-transitory computer readable memory as defined in claim 20, wherein the program instructions when executed by a computer system device are further configured to cause the computer system to use at least a portion of the received telemetry data to:

determine a presence of a first object at a first location on a digital map of a first segment of the first route;

determine whether the received telemetry data includes sensor data indicating a presence of the first object at the first location; and at least partly in response to a determination that the sensor data does not indicate a presence of the first object at the first location, access telemetry data of other vehicles that have traversed a route that includes a view of the first location to determine if the telemetry data of the other vehicles includes sensor data indicating a presence of the first object at the first location; and at least partly in response to a determination that the telemetry data of the other vehicles does not include sensor data indicating a presence of the first object at the first location, update the digital map to indicate that first object is not present at the first location.

* * * * *

UNITED STATES PATENT AND TRADEMARK OFFICE
CERTIFICATE OF CORRECTION

PATENT NO. : 11,131,554 B2  
APPLICATION NO. : 16/232472  
DATED : September 28, 2021  
INVENTOR(S) : Tingbo Hou It is certified that error appears in the above-identified patent and that said Letters Patent is hereby corrected as shown below:

In the Specification

In Column 15, Line 3, delete "(e.g.," and insert -- e.g., --.

In Column 16, Line 54, delete "[If" and insert -- If --.

In Column 20, Line 9 (approx.), delete "disclosed" and insert -- disclosed. --.

In the Claims

In Column 29, Line 32, Claim 1, delete "notes" and insert -- nodes --.

In Column 31, Line 43, Claim 10, delete "notes" and insert -- nodes --.

In Column 33, Line 24 (approx.), Claim 20, delete "notes" and insert -- nodes --.

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*